(12) United States Patent
Hirao

(10) Patent No.: US 7,945,095 B2
(45) Date of Patent: May 17, 2011

(54) LINE SEGMENT DETECTOR AND LINE SEGMENT DETECTING METHOD

(75) Inventor: Kouichirou Hirao, Kakegawa (JP)

(73) Assignee: NEC Corporation, Tokyo (JP)

( * ) Notice: Subject to any disclaimer, the term of this patent is extended or adjusted under 35 U.S.C. 154(b) by 1163 days.

(21) Appl. No.: 11/621,821

(22) Filed: Jan. 10, 2007

(65) Prior Publication Data

US 2007/0172128 A1 Jul. 26, 2007

(30) Foreign Application Priority Data

Jan. 11, 2006 (JP) .................................. 2006-003718

(51) Int. Cl.
*G06K 9/00* (2006.01)
(52) U.S. Cl. ....................................................... 382/181
(58) Field of Classification Search .................. 382/181, 382/231
See application file for complete search history.

(56) References Cited

U.S. PATENT DOCUMENTS

2002/0154121 A1 10/2002 Ogawa et al.
2003/0108237 A1 6/2003 Hirata

FOREIGN PATENT DOCUMENTS

| JP | 393355 | 4/1991 |
|----|--------|--------|
| JP | 9139839 | 5/1997 |
| JP | 10336443 | 12/1998 |
| JP | 2002-281299 A | 9/2002 |

OTHER PUBLICATIONS

Tadrous P J: "A simple and sensitive method for directional edge detection in noisy images" Pattern Recognition, Elsevier, Kidlington, GB, vol. 28, No. 10, Oct. 1995, pp. 1575-1586, XP004002553, ISSN: 0031-3203.

*Primary Examiner* — Brian Q Le
*Assistant Examiner* — Edward Park
(74) *Attorney, Agent, or Firm* — Sughrue Mion, PLLC

(57) ABSTRACT

A line segment detector comprises a vertical line detecting part, a horizontal line detecting part, a left-to-right downward slanting line detecting part, a left-to-right upward slanting line detecting part, and a line-segment detecting/synthesizing section that calculates OR operation of output values from the vertical line detecting part, the horizontal line detecting part, the left-to-right downward slanting line detecting part, and the left-to-right upward slanting line detecting part. The line segment detector further comprises a re-determining unit comprising a second line-segment detecting part that sets a window to the detection result near the target pixel, counts the number of pixels whose detection result is determined as the line segment in the set window, determines, when the counted value is not smaller than a predetermined threshold value, that the pixel is a line segment.

18 Claims, 11 Drawing Sheets

FIG. 2A

INPUT IMAGE

MAIN-SCANNING DIRECTION →

SUB-SCANNING DIRECTION ↓

| 1 | 1 | 1 | -1 | -1 | -1 |
| 2 | 2 | 2 | -2 | -2 | -2 |
| 3 | 3 | 3 | -3 | -3 | -3 |
| 3 | 3 | 3 | -3 | -3 | -3 |
| 3 | 3 | 3 | -3 | -3 | -3 |
| 2 | 2 | 2 | -2 | -2 | -2 |
| 1 | 1 | 1 | -1 | -1 | -1 |

| 1  | 2  | 3  | 3  | 3  | 2  | 1  |
|----|----|----|----|----|----|----|
| 1  | 2  | 3  | 3  | 3  | 2  | 1  |
| 1  | 2  | 3  | 3  | 3  | 2  | 1  |
| -1 | -2 | -3 | -3 | -3 | -2 | -1 |
| -1 | -2 | -3 | -3 | -3 | -2 | -1 |
| -1 | -2 | -3 | -3 | -3 | -2 | -1 |

|      |      |      |      |      |      |      |      |      |
|------|------|------|------|------|------|------|------|------|
| X00  | X01  | X02  | X03  | X04  | X05  | X06  | X07  | X08  |
| X10  | X11  | X12  | X13  | X14  | X15  | X16  | X17  | X18  |
| X20  | X21  | X22  | X23  | X24  | X25  | X26  | X27  | X28  |
| X30  | X31  | X32  | X33  | X34  | X35  | X36  | X37  | X38  |
| X40  | X41  | X42  | X43  | a    | X45  | X46  | X47  | X48  |
| X50  | X51  | X52  | X53  | X54  | X55  | X56  | X57  | X58  |
| X60  | X61  | X62  | X63  | X64  | X65  | X66  | X67  | X68  |
| X70  | X71  | X72  | X73  | X74  | X75  | X76  | X77  | X78  |
| X80  | X81  | X82  | X83  | X84  | X85  | X86  | X87  | X88  |

W11 (left), W12 (right)

FIG. 4A

| 0 | 0 | 0  | 0  | 0  | 0  | 0  | 0  | 0  |
|---|---|----|----|----|----|----|----|----|
| 0 | 2 | 2  | -2 | -2 | -2 | -1 | 0  | 0  |
| 0 | 3 | 3  | 3  | -3 | -3 | -3 | -1 | 0  |
| 0 | 1 | 3  | 3  | 3  | -3 | -3 | -3 | -1 |
| 0 | 0 | 1  | 3  | 3  | 3  | -3 | -3 | -3 |
| 0 | 0 | 0  | 1  | 2  | 2  | 2  | -2 | -2 |

|      |      |      |      |      |      |      |      |      |
|------|------|------|------|------|------|------|------|------|
| X00  | X01  | X02  | X03  | X04  | X05  | X06  | X07  | X08  |
| X10  | X11  | X12  | X13  | X14  | X15  | X16  | X17  | X18  |
| X20  | X21  | X22  | X23  | X24  | X25  | X26  | X27  | X28  |
| X30  | X31  | X32  | X33  | X34  | X35  | X36  | X37  | X38  |
| X40  | X41  | X42  | X43  | a    | X45  | X46  | X47  | X48  |
| X50  | X51  | X52  | X53  | X54  | X55  | X56  | X57  | X58  |
| X60  | X61  | X62  | X63  | X64  | X65  | X66  | X67  | X68  |
| X70  | X71  | X72  | X73  | X74  | X75  | X76  | X77  | X78  |
| X80  | X81  | X82  | X83  | X84  | X85  | X86  | X87  | X88  |

|     |     |     |     |     |     |     |     |     |
|-----|-----|-----|-----|-----|-----|-----|-----|-----|
| X00 | X01 | X02 | X03 | X04 | X05 | X06 | X07 | X08 |
| X10 | X11 | X12 | X13 | X14 | X15 | X16 | X17 | X18 |
| X20 | X21 | X22 | X23 | X24 | X25 | X26 | X27 | X28 |
| X30 | X31 | X32 | X33 | X34 | X35 | X36 | X37 | X38 |
| X40 | X41 | X42 | X43 | a   | X45 | X46 | X47 | X48 |
| X50 | X51 | X52 | X53 | X54 | X55 | X56 | X57 | X58 |
| X60 | X61 | X62 | X63 | X64 | X65 | X66 | X67 | X68 |
| X70 | X71 | X72 | X73 | X74 | X75 | X76 | X77 | X78 |
| X80 | X81 | X82 | X83 | X84 | X85 | X86 | X87 | X88 |

W16 — left side, W17 — right side

FIG. 5A

| 0 | 0 | 0 | 0 | 0 | 0 | 0 | 0 | 0 |
|---|---|---|---|---|---|---|---|---|
| 0 | 0 | 1 | 2 | 2 | 2 | -2 | -2 | 0 |
| 0 | 1 | 3 | 3 | 3 | -3 | -3 | -3 | 0 |
| 1 | 3 | 3 | 3 | -3 | -3 | -3 | -1 | 0 |
| 3 | 3 | 3 | -3 | -3 | -3 | -1 | 0 | 0 |
| 2 | 2 | -2 | -2 | -2 | -1 | 0 | 0 | 0 |

|     |     |     |     |     |     |     |     |     |
|-----|-----|-----|-----|-----|-----|-----|-----|-----|
| X00 | X01 | X02 | X03 | X04 | X05 | X06 | X07 | X08 |
| X10 | X11 | X12 | X13 | X14 | X15 | X16 | X17 | X18 |
| X20 | X21 | X22 | X23 | X24 | X25 | X26 | X27 | X28 |
| X30 | X31 | X32 | X33 | X34 | X35 | X36 | X37 | X38 |
| X40 | X41 | X42 | X43 | a   | X45 | X46 | X47 | X48 |
| X50 | X51 | X52 | X53 | X54 | X55 | X56 | X57 | X58 |
| X60 | X61 | X62 | X63 | X64 | X65 | X66 | X67 | X68 |
| X70 | X71 | X72 | X73 | X74 | X75 | X76 | X77 | X78 |
| X80 | X81 | X82 | X83 | X84 | X85 | X86 | X87 | X88 |

LINE SEGMENT DETECTOR AND LINE SEGMENT DETECTING METHOD

This application claims priority to prior application, JP 2006-3718, the disclosure of which is incorporated herein by reference.

BACKGROUND OF THE INVENTION

The present invention relates to a line segment detector that detects a line segment in an image mixedly having a dot and a line segment, in particular, to a line segment detector and a line segment detecting method in which not only the contour of a character and a line segment but also the content thereof is detected as a line-segment image and corrects erroneous determination of the line segment and preferably detects the line segment.

One example of a line segment detector is disclosed in Japanese Unexamined Patent Application Publication No. 2002-281299 (hereinafter, referred to Patent Document 1). The line segment detector detects character and diagram line-segments from input images or line segments of the contour portions of natural images. The Patent Document 1 discloses embodiments and a description will be given of one example for detecting a vertical line in an image.

A vertical line detecting/left portion averaging section sets a window near the left of a target pixel in an image and calculates the weighted average of pixel values in the set window. A vertical line detecting/right portion averaging section sets a window near the right of the target pixel in the image and calculates the weighted average of pixel values in the set window. A vertical line detecting/differentiating section calculates the absolute value of the difference between an output value of the vertical line detecting/left portion averaging section and an output value of the vertical line detecting/right portion averaging section. A vertical line/dot detecting section sets a window having the target pixel in the image and calculates the average of absolute values of differential values between upper and lower pixels in the set window. A vertical line detecting/comparing section subtracts an output value of the vertical line/dot detecting section from an output value of the vertical line detecting/differentiating section and compares the subtraction result with a threshold value. When the subtraction result is higher than the threshold value, the vertical line detecting/comparing section determines that the target pixel is a vertical line image.

With the line segment detector disclosed in the Patent Document 1, upon extracting the character or diagram from the image read by an input device of a still image, such as a color scanner, only the contour of the character or diagram is extracted. The extraction result is effective for a part of image processing, e.g., emphasis of the contour. However, upon dividing the image into a character area and an area except for the character (referred to as a photographic area) and performing image compression of the divided areas, the extraction result contains data only on the contour, the content of the character therefore remains, and preferable compression efficiency is not obtained. The improvement in compression efficiency requires not only the character contour and the entire character including the character area containing the content of the character.

As mentioned above, in the conventional detection of the line segment in the dot image, only the edge portion of the line segment is detected. Upon an object encoding, e.g., with JBIG2, MRC, or JPEG 2000-Part 6 as image compression by using the detection result, the character is not extracted as one object. Hence, the compression efficiency deteriorates because the character is divided into a mask image and a background image. Further, the image quality deteriorates. Furthermore, upon obtaining, as the extraction result, an element that is not obviously the line segment such as an isolated point, the conventional method does not have correction means thereof. Consequently, when the line segment image is emphasized in the image processing, the dot is emphasized and the image quality deteriorates.

SUMMARY OF THE INVENTION

Accordingly, in order to solve the above-mentioned problem, it is an object of the present invention to provide a line segment detector and a line segment detecting method, by which the character including the content thereof as well as the contour thereof is extracted.

In the present invention, in order to solve the above problem, a line segment result counting section first sets a window having a target pixel at the center thereof to a detection result obtained by a line segment detecting/synthesizing section, and counts the number of line segment images in the window. A second line-segment detecting part re-determines the detection of the line segment on the basis of the counted value. As a consequence, the detection result is obtained with the line-segment image expanded to both the inside and the outside of the contour with the contour as center.

Subsequently, a threshold value generating part calculates the average of pixel values in the window of the input image, and generates a threshold value on the basis of the calculated average. Further, a pre-processing section performs MTF correction of the input image.

Based on the above-mentioned results, a third line-segment detecting part performs out determination about the result that was determined as the line-segment image by the second line-segment detecting part, and determines that the target pixel is a line segment image when the pixel value after the pre-processing is not larger than the threshold value, and that the target pixel is not a line segment image when the pixel value is larger than the threshold value.

A detection-result correcting section performs removing processing of a part indicating that the target pixel is not obviously the line segment image, e.g., an isolated point as the detection result, and obtains a preferable detection result with reduction of erroneous detection.

According to a first aspect of the present invention, a line segment detector includes a first line-segment detecting part comprising a vertical line detecting part that detects whether or not an input image has a vertical line, a horizontal line detecting part that detects whether or not the input image has a horizontal line, a left-to-right downward slanting line detecting part that detects whether or not the input image has a left-to-right downward slanting line, a left-to-right upward slanting line detecting part that detects whether or not the input image has a left-to-right upward slanting line, and a line-segment detecting/synthesizing section that calculates OR operation of output values from the vertical line detecting part, the horizontal line detecting part, the left-to-right downward slanting line detecting part, and the left-to-right upward slanting line detecting part. The line segment detector further comprises a re-determining unit that re-determines whether or not the detection result output from the line-segment detecting/synthesizing section is a line segment.

In the line segment detector according to the first aspect, the re-determining unit comprises a second line-segment detecting part that sets a window to the detection result near the target pixel, counts the number of pixels whose detection result is determined as the line segment in the set window, determines, when the counted value is not smaller than a predetermined threshold value, that the pixel is the line segment, further determines, when the counted value is smaller than the predetermined threshold value, that the pixel is not the line segment, and outputs a new detection result.

In the line segment detector according to the first aspect, the second line-segment detecting part comprises a first line-memory that holds and delays the detection result output from the line-segment detecting/synthesizing section, a line-segment result counting section that is connected to the first line-memory, sets the window to the detection result near the target pixel, and counts the number of pixels whose detection result in the window is determined as the line segment, and a second line-segment detecting section that compares the counted value of the line-segment result counting section with the predetermined threshold value, determines, when the counted value is not smaller than the predetermined threshold value, that the pixel is the line segment, further determines, when the counted value is smaller than the predetermined threshold value, that the pixel is not the line segment, and outputs the new detection result.

In the line segment detector according to the first aspect, the re-determining unit further comprises a threshold value generating part that sets a window near the target pixel, calculates the average of pixel values in the set window, adds a specific value to the calculated average, and generates another threshold value for use in third line-segment detection, a pre-processing section that performs pre-processing of the input image, and a third line-segment detecting section that receives the detection result of the second line-segment detecting section and the processing result of the input image of the pre-processing section, and determines with the other threshold value generated by the threshold value generating part whether the detection result is a line image or surface image.

In the line segment detector according to the first aspect, the threshold value generating part comprises an average calculating section that calculates the average of pixel values in the set window, and a threshold value generating section that generates the other threshold value on the basis of the calculated average.

In the line segment detector according to the first aspect, the re-determining unit further comprises a second line-memory that holds and delays the third line-segment detection result output from the third line-segment detecting section, and a detection result correcting section that is connected to the second line-memory, sets a window to the third line-segment detection result near the target pixel, and corrects the detection result of the target pixel when a specific pattern is found in the window.

According to a second aspect of the present invention, an image processing apparatus comprising the above-mentioned line segment detector is provided.

According to a third aspect of the present invention, a line segment detecting method includes a first line-segment detecting step comprising a vertical line detecting step of determining whether or not an input image has a vertical line, a horizontal line detecting step of determining whether or not the input image has a horizontal line, a left-to-right downward slanting line detecting step of determining whether or not the input image has a left-to-right downward slanting line, a left-to-right upward slanting line detecting step of determining whether or not the input image has a left-to-right upward slanting line, and a line-segment detecting/synthesizing step of performing OR operation of output values obtained by the vertical line detecting step, the vertical line detecting step, the left-to-right downward slanting line detecting step, and the left-to-right upward slanting line detecting step. The line segment detecting method further comprises a second line-segment detecting step of setting a window to the line-segment result near a target pixel, counting the number of pixels in which the line-segment result is determined as the line segment in the window, further determining, when the counted value is not smaller than a predetermined threshold value, that the pixel is the line segment, furthermore determining, when the counted value is smaller than the predetermined threshold value, that the pixel is not the line segment, and outputting a new line-segment detecting result.

According to a fourth aspect of the present invention, a line segment detector includes a first line-segment detecting part comprising a vertical line detecting part that determines whether or not a color input image has a vertical line, a horizontal line detecting part that determines whether or not the color input image has a horizontal line, a left-to-right downward slanting line detecting part that determines whether or not the color input image has a left-to-right downward slanting line, a left-to-right upward slanting line detecting part that determines whether or not the color input image has a left-to-right upward slanting line, and a color image line-segment detecting/synthesizing section that performs OR operation of output values from the vertical line detecting part, the horizontal line detecting part, the left-to-right downward slanting line detecting part, and the left-to-right upward slanting line detecting part. The line segment detector further comprises a re-determining unit that re-determines whether or not the detection result output from the line-segment detecting/synthesizing section is a line segment.

According to a fifth aspect of the present invention, an image processing apparatus comprising the line segment detector according to the fourth aspect is provided.

According to a sixth aspect of the present invention, a line segment detecting method includes a first line-segment detecting step comprising a vertical line detecting step of determining whether or not a color input image has a vertical line, a horizontal line detecting step of determining whether or not the color input image has a horizontal line, a left-to-right downward slanting line detecting step of determining whether or not the color input image has a left-to-right downward slanting line, a left-to-right upward slanting line detecting step of determining whether or not the color input image has a left-to-right upward slanting line, and a color image line-segment detecting/synthesizing step of performing OR operation of output values from the vertical line detecting step, the horizontal line detecting step, the left-to-right downward slanting line detecting step, and the left-to-right upward slanting line detecting step. The line segment detecting method further comprises a second line-segment detecting step of setting a window to the line-segment result near the target pixel, counting the number of pixels on the line segment in the window for individual color components C1, C2, and C3, determining, when the counted total number of pixels is not smaller than a predetermined threshold value, that the pixel is the line segment, further determining, when the counted total number of pixels is smaller than the predetermined threshold value, that the pixel is not the line segment, furthermore determining which of the color components C1 to C3 is the line segment, and outputting a new line-segment detection result.

Upon detecting a line segment in an image mixedly having a dot and a line segment, with the conventional method and apparatus, only the contour of the character or line regarded as the line segment is detected. On the other hand, according to the present invention, even the content of the character or line can be detected as a line segment without numerous resources. As a consequence, the character including not only the contour but also the content thereof can be extracted as the character, and the performance of the image quality/compression efficiency is improved in the image compression using the object encoding such as JBIG2, MRC, and JPEG2000-Part 6. Further, the correction of the detection result improves the precision of the detection result and the image compression and the image quality are improved without noise components of an isolated point.

With respect to the conventional detection result of only the contour, depending on the counted value of a number of line segments in the window, it is re-determined that the portion determined as the line segment is a line segment when there is the number of line segments is not smaller than a predetermined threshold value, and that it is not a line segment if not so. Thus, the circumference of the result of the line segment is expanded and the portion of the line segment is extended. Thus, the portion having only the contour is blurred and the inside of the contour of the character or line is provided. However, only with this, the detection result expanded to the outside of the contour may include erroneous detection. Therefore, thin-line processing (re-forming processing of the line segment) is executed as further detection processing. Specifically, with respect to the pixel that was determined as the line-segment image with the second line-segment detection, when the pixel value subjected to the pre-processing is smaller than a threshold value in the comparison therebetween, it is determined that the pixel is the line segment image and that the pixel is not the line segment image when the pixel value is not smaller than the line segment image. Thus, the content and contour of the character and line remain, and a portion of the erroneous detection other than the contour is deleted. The above processing enables a desired division result to be obtained.

Further, if this result is corrected, the advantage of post-processing such as image processing and image compression can be improved. In other words, this means the correction for removing the detection result indicating that the detected line segment is not obviously a line segment. Thus, the precision of the division result is improved and, e.g., in the image compression, the compression performance can be improved by removing the isolated point serving as the noise component.

BRIEF DESCRIPTION OF THE DRAWINGS

FIGS. 2A to 2D are diagrams for illustrating detection of a vertical line with the line segment detector shown in FIG. 1;

FIGS. 3A to 3C are diagrams for illustrating detection of a horizontal line with the line segment detector shown in FIG. 1;

FIGS. 4A to 4C are diagrams for illustrating detection of a left-to-right downward slanting line with the line segment detector shown in FIG. 1;

FIGS. 5A to 5C are diagrams for illustrating detection of a left-to-right upward slanting line with the line segment detector shown in FIG. 1;

FIG. 6 is a diagram showing a window example for counting the number of line segments for second line-segment detection according to the present invention;

FIG. 7 is a diagram showing an average window example for third line-segment detection according to the present invention;

DESCRIPTION OF THE PREFERRED EMBODIMENTS

First Embodiment

Figure 1:
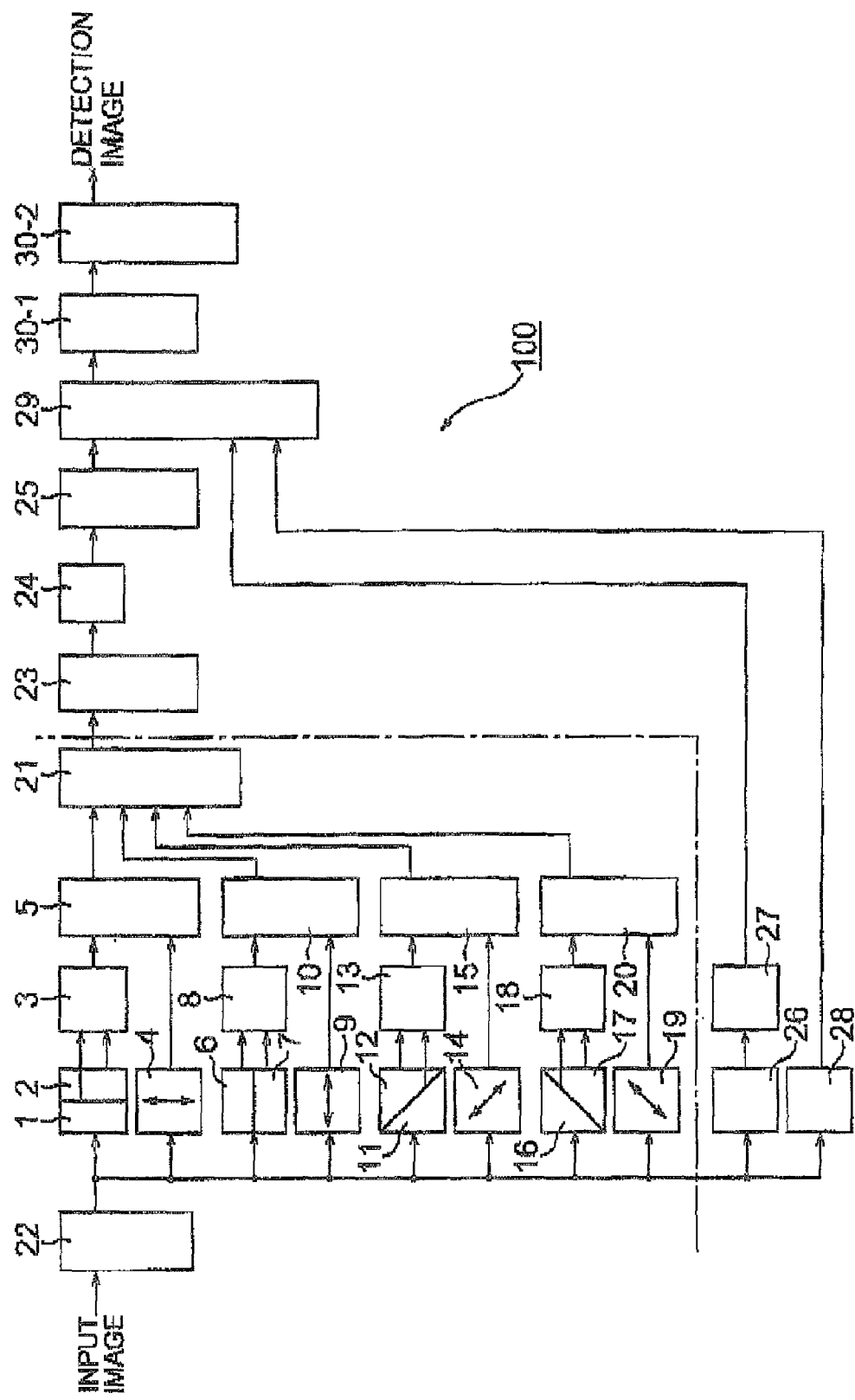
FIG. 1 is a block diagram schematically showing a line segment detector according to the first embodiment of the present invention.

Hereinbelow, a description will be given of embodiments of the present invention with reference to the drawings. FIG. 1 is a block diagram showing the structure of a line segment detector according to the first embodiment of the present invention. At first, a description will be given of components of the line segment detector.

A vertical line detecting/left portion averaging section 1 sets a window near the left side of a target pixel and calculates the weighted average of pixel values in the set window. A vertical line detecting/right portion averaging section 2 sets a window near the right side of the target pixel and calculates the weighted average of pixel values in the set window. A vertical line detecting/differentiating section 3 calculates the absolute value of the difference between an output value from the vertical line detecting/left portion averaging section 1 and an output value from the vertical line detecting/right portion averaging section 2. A vertical line/dot detecting section 4 sets a window near the target pixel and calculates the average of the absolute values of differential values between upper and lower pixels in the set window. A vertical line detecting/comparing section 5 subtracts an output value of the vertical line/dot detecting section 4 from an output value of the vertical line detecting/differentiating section 3 and compares the subtraction result with a first threshold value. A vertical line detecting/comparing section 5 determines, when the subtraction result is larger than the first threshold value, that the target pixel is a vertical line image, namely, the vertical line image is present. The vertical line detecting/left portion averaging section 1, the vertical line detecting/right portion averaging section 2, the vertical line detecting/differentiating section 3, the vertical line/dot detecting section 4, and the vertical line detecting/comparing section 5 may collectively called a vertical line detecting part.

A horizontal line detecting/upper portion averaging section 6 sets a window near the upper side of the target pixel and calculates the weighted average of pixel values in the set window. A horizontal line detecting/lower portion averaging section 7 sets a window near the lower side of the target pixel and calculates the weighted average of pixel values in the set window. A horizontal line detecting/differentiating section 8 calculates the absolute value of the difference between an output value from the horizontal line detecting/upper portion averaging section 6 and an output value from the horizontal line detecting/lower portion averaging section 7. A horizontal line/dot detecting section 9 sets a window near the target pixel and calculates the average of the absolute values of differential values between left and right pixels in the set window. A horizontal line detecting/comparing section 10 subtracts an output value of the horizontal line/dot detecting section 9 from an output value of the horizontal line detecting/differentiating section 8 and compares the subtraction result with a second threshold value. The horizontal line detecting/comparing section 10 determines, when the subtraction result is larger than the second threshold value, that the target pixel is a horizontal line image, namely, the horizontal line image is present. The horizontal line detecting/upper portion averaging section 6, the horizontal line detecting/lower portion averaging section 7, the horizontal line detecting/differentiating section 3, the horizontal line/dot detecting section 9, and the horizontal line detecting/comparing section 10 may collectively called a horizontal line detecting part.

A left-to-right downward slanting line detecting/lower left oblique portion averaging section 11 sets a window near the lower left oblique side of the target pixel and calculates the weighted average of pixel values in the set window so as to detect a left-to-right downward slanting line. An left-to-right downward slanting line detecting/upper right oblique portion averaging section 12 sets a window near the upper right oblique side of the target pixel and calculates the weighted average of pixel values in the set window so as to detect a left-to-right downward slanting line. A left-to-right downward slanting line detecting/differentiating section 13 calculates the absolute value of the difference between an output value from the left-to-right downward slanting line detecting/upper right oblique portion averaging section 12 and an output value from the left-to-right downward slanting line detecting/lower left oblique portion averaging section 11. A left-to-right downward slanting line/dot detecting section 14 sets a window near the target pixel and calculates the average of the absolute values of differential values between the pixels in the lower right oblique direction in the set window. A left-to-right downward slanting line detecting/comparing section 15 subtracts an output value of the left-to-right downward slanting line/dot detecting section 14 from an output value of the left-to-right downward slanting line detecting/differentiating section 13 and compares the subtraction result with a third threshold value. Further, the left-to-right downward slanting line detecting/comparing section 15 determines, when the subtraction value is larger than the third threshold value, that the target pixel is a left-to-right downward slanting line image, namely, the left-to-right downward slanting line image is present. The left-to-right downward slanting line detecting/lower left oblique portion averaging section 11, the left-to-right downward slanting line detecting/upper right oblique portion averaging section 12, the left-to-right downward slanting line detecting/differentiating section 13, the left-to-right downward slanting line/dot detecting section 14, and the left-to-right downward slanting line detecting/comparing section 15 may collectively be called a left-to-right downward slanting line detecting part.

A left-to-right upward slanting line detecting/upper left oblique portion averaging section 16 sets a window near the upper left oblique side of the target pixel and calculates the weighted average of pixel values in the set window so as to detect a left-to-right upward slanting line. A left-to-right upward slanting line detecting/lower right oblique portion averaging section 17 sets a window near the lower right oblique side of the target pixel and calculates the weighted average of pixel values in the window so as to detect a left-to-right upward slanting line. A left-to-right upward slanting line detecting/differentiating section 18 calculates the absolute value of the difference between an output value from the left-to-right upward slanting line detecting/upper left oblique portion averaging section 16 and an output value from the left-to-right upward slanting line detecting/lower right oblique portion averaging section 17. A left-to-right upward slanting line/dot detecting section 19 sets a window near the target pixel and calculates the average of the absolute values of differential values between the pixels in the upper right oblique direction in the set window. A left-to-right upward slanting line detecting/comparing section 20 subtracts an output value of the left-to-right upward slanting line/dot detecting section 19 from an output value of the left-to-right upward slanting line detecting/differentiating section 18 and compares the subtraction result with a fourth threshold value. Further, the left-to-right upward slanting line detecting/comparing section 20 determines, when the subtraction result is larger than the fourth threshold value, that the target pixel is a left-to-right downward slanting line image, namely, the left-to-right downward slanting line image is present. The left-to-right upward slanting line detecting/upper left oblique portion averaging section 16, the left-to-right upward slanting line detecting/lower right oblique portion averaging section 17, the left-to-right upward slanting line detecting/differentiating section 18, the left-to-right upward slanting line/dot detecting section 19, and the left-to-right upward slanting line detecting/comparing section 20 may collectively called a left-to-right upward slanting line detecting part.

A line segment detecting/synthesizing section 21 operates the logical OR between an output value from the vertical line detecting/comparing section 5, an output value from the horizontal line detecting/comparing section 10, an output value from the left-to-right downward slanting line detecting/comparing section 15, and an output value from the left-to-right upward slanting line detecting/comparing section 20. A line memory 22 arranged at the input side delays an input image and obtains images of a plurality of lines.

The above-mentioned structure is the same as that of the line segment detector disclosed in the Patent Document 1. The vertical line detecting part, the horizontal line detecting part, the left-to-right downward slanting line detecting part, the left-to-right upward slanting line detecting part, and the line-segment detecting/synthesizing section 21 collectively serve as a first line-segment detecting part.

According to the first embodiment, the line segment detector comprises the following components in addition to the above components.

A line segment result line-memory (first line-memory) 23 holds and delays a line segment result input from the line segment detecting/synthesizing section 21. A line segment result counting-section 24 sets a window to a line segment result near the target pixel, and counts the number of pixels determined that the line segment result in the set window is a line segment. A second line-segment detecting section 25 compares the counting result with a fifth threshold value (predetermined threshold value). Further, the second line-segment section 25 determines, when the counting result is not smaller than the fifth threshold value, that is, a line segment having the number of pixels not smaller than the fifth threshold value is present, that the target pixel is a line segment, namely, the line segment is present, and, when the counting value is smaller than the fifth threshold value, that the target pixel is a non line-segment, namely, the line segment is no present, and outputs a new line segment detecting result.

An average calculating section 26 connected to the line memory 22 sets a window near the target pixel and calculates the average of pixel values in the set window. A threshold value generating section 27 adds a specific value to the calculated average and generates a sixth threshold value (another threshold value) for use in third line-segment detection. A pre-processing section 28 connected to the line memory 22 performs pre-processing, such as MTF correction, of the input image so as to improve the precision in the third line-segment detection.

A third line-segment detecting section 29 determines the detection result of the second line-segment detecting section 25 and the processing result of the input image of the pre-processing section 28 by using the sixth threshold value generated by the threshold value generating section 27. A detection result line memory (second line-memory) 30-1 holds and delays the detection result of the third line-segment detecting section 29. A detection result correcting section 30-2 sets a window to the third line-segment detection result near the target pixel and changes the detection result of the target pixel, when a specific pattern is found in the set window.

Next, operation of the above-mentioned line segment detector will be described. At first, vertical line detection will be described with reference to FIGS. 2A to 2D. Assume that an input image like the one shown in FIG. 2A is input. In this case, since calculation across lines must be performed for a plurality of lines, image data corresponding to the plurality of lines must be simultaneously input to the vertical line detecting/left portion averaging section 1, vertical line detecting/right portion averaging section 2, vertical line/dot detecting section 4, horizontal line detecting/upper portion averaging section 6, horizontal line detecting/lower portion averaging section 7, horizontal line/dot detecting section 9, left-to-right downward slanting line detecting/lower left oblique portion averaging section 11, left-to-right downward slanting line detecting/upper right oblique portion averaging section 12, left-to-right downward slanting line/dot detecting section 14, left-to-right upward slanting line detecting/upper left oblique portion averaging section 16, left-to-right upward slanting line detecting/lower right oblique portion averaging section 17, left-to-right upward slanting line/dot detecting section 19, average calculating section 26, and pre-processing section 28.

In this embodiment, the input images corresponding to the plurality of lines are therefore simultaneously input by using the line memory 22. In FIG. 2A, reference symbols X00 to X08, X10 to X18, X20 to X28, X30 to X38, X40 to X48, X50 to X58, X60 to X68, X70 to X78, and X80 to X88 denote pixel values.

The vertical line detecting/left portion averaging section 1 sets a rectangular window W1 constituted by n1 pixels in the main scanning direction (the main scanning direction is the horizontal direction; n1=~3)×m1 pixels in the sub-scanning direction (the sub-scanning direction is the vertical direction; m1=7) on the left side of a target pixel a, and calculates the weighted average of the pixel values in the window W1. More specifically, if the window W1 is set as shown in FIG. 2B, an output value from the vertical line detecting/left portion averaging section 1 is obtained according to equation (1).

Output value of the vertical line detecting/left portion averaging section={(X11+X12+X13)×α+(X21+X22+X23)×β+(X31+X32+X33)×

γ+(X41+X42+X43)×γ+(X51+X52+X53)×γ+(X61+X62+X63)×

β+(X71+X72+X73)×α}/ε.     (1)

In equation (1), α, β, and γ are weights by which the pixel values X11 to X13, X21 to X23, X31 to X33, X41 to X43, X51 to X53, X61 to X63, and X71 to X73 are multiplied. The weights α, β, and γ are set to be larger as the corresponding pixels are located nearer to the target pixel a. In this embodiment, α=1, β=2, and γ=3.

If all the weights α, β, and γ are "1", ε becomes equal to the number of pixels, 3×7=21, in the window W1. In this embodiment, however, since α=1, β=2, and γ=3, ε becomes equal to 45=α×(6, the number of pixels to be multiplied by the weight α)+β×(6, the number of pixels to be multiplied by the weight β)+γ×(9, the number of pixels to be multiplied by weight γ).

The vertical line detecting/right portion averaging section 2 sets a rectangular window W2 constituted by n1 pixels in the main scanning direction×m1 pixels in the sub-scanning direction on the right side of the target pixel a, and calculates the weighted average of the pixel values in the window W2. More specifically, if the window W2 is set as shown in FIG. 2B, an output value from the vertical line detecting/right portion averaging section 2 is obtained according to equation (2).

Output value of the vertical line detecting/right portion averaging section=

{(X14+X15+X16)×α+(X24+X25+X26)×β+(X34+X35+X36)×

γ+(a+X45+X46)×γ+(X54+X55+X56)×γ+(X64+X65+X66)×

β+(X74+X75+X76)×α}/ε.     (2)

Note that the windows W1 and W2 are set such that there are no overlapping pixels and one of the windows contains the target pixel a. The windows W1 and W2 may be spaced apart from each other. In this case, however, the line memory used need to be increased in size. For this reason, as shown in FIG. 2B, the windows W1 and W2 are preferably set adjacent to each other.

The vertical line detecting/differentiating section 3 calculates the absolute value of the difference between the output value from the vertical line detecting/left portion averaging section 1 and the output value from the vertical line detecting/right portion averaging section 2. More specifically, the output value from the vertical line detecting/differentiating section 3 is obtained according to equation (3):

Output value of the vertical line detecting/differentiating section=

|output value of the vertical line detecting/left portion averaging section− output value of the vertical line detecting/right portion averaging section|.     (3)

FIG. 2C schematically shows the calculation performed by the vertical line detecting/differentiating section 3. In FIG. 2C, the bullet indicates the position of the target pixel a.

The vertical line/dot detecting section 4 sets a rectangular window W4 containing the target pixel a, which is constituted by k1 (k1=5 in this embodiment) pixels in the main scanning direction×j1 (j1=6 in this embodiment) pixels in the sub-scanning direction, and calculates the average of the absolute values of differential values between the upper and lower pixels in the window W4. More specifically, if the window W4 is set as shown in FIG. 2D, the output value from the vertical line/dot detecting section 4 is obtained according to equation (4).

Output value of the vertical line/dot detecting section=

(|X22−X32|+|X32−X42|+|X42−X52|+|X52−X62|+|X62−X72|

+|X23−X33|+|X33−X43|+|X43−X53|+|X53−X63|+|X63−X73|

$$+|X24-X34|+|X34-a|+|a-X54|+|X54-X64|+|X64-X74|+|$$

$$X25-X35|+|X35-X45|+|X45-X55|+|X55-X65|+|X65-X75|+|$$

$$X26-X36|+|X36-X46|+|X46-X56|+|X56-X66|+|X66-X76|)/25 \quad (4)$$

The output value from the vertical line/dot detecting section 4 is not obtained by calculating a difference after calculation of averages, and hence indicates a relatively large value when the image in the window W4 containing the target pixel a is a dot image. In contrast to this, if the image in the window W4 containing the target pixel a is a vertical line image, since differentiation is performed between the pixels in the vertical direction (parallel to a vertical line), this output value indicates a relatively small value.

The vertical line detecting/comparing section 5 subtracts the output value of the vertical line/dot detecting section 4 from the output value of the vertical line detecting/differentiating section 3, and compares the subtraction result with the first threshold value. If the subtraction result is larger than the first threshold value, the vertical line detecting/comparing section 5 determines that the target pixel a or its neighboring pixel is a vertical image, and set the output value to "1". If the subtraction result is not larger than the first threshold value, the vertical line detecting/comparing section 5 determines that the pixel is not a vertical line image, and sets the output value to "0".

Horizontal line detection will be described next with reference to FIGS. 3A to 3C. The horizontal line detecting/upper portion averaging section 6 sets a rectangular window W6 constituted by n2 (n2=7 in this embodiment) pixels in the main scanning direction×m2 (m2=3 in this embodiment) pixels in the sub-scanning direction on the upper side of the target pixel a of the input image shown in FIG. 2A, and calculates the weighted average of the pixel values in the window W6. More specifically, if the window W6 is set as shown in FIG. 3A, the output value from the horizontal line detecting/upper portion averaging section 6 is obtained according to equation (5).

Output value of the horizontal line detecting/upper portion averaging section=

$$\{(X11+X21+X31)\times\alpha+(X12+X22+X32)\times\beta+(X13+X23+X33)\times$$

$$\gamma+(X14+X24+X34)\times\gamma+(X15+X25+X35)\times\gamma+(X16+X26+X36)\times$$

$$\beta+(X17+X27+X37)\times\alpha\}/\zeta. \quad (5)$$

If all the weights α, β, and γ are "1", ζ becomes equal to the number of pixels, 3×7=21, in the window W6. In this embodiment, however, since α=1, β=2, and γ=3, ζ becomes equal to 45=α×(6, the number of pixels to be multiplied by the weight α)+β×(6, the number of pixels to be multiplied by the weight β)+γ×(9, the number of pixels to be multiplied by weight γ).

The horizontal line detecting/lower portion averaging section 7 sets a rectangular window W7 constituted by n2 pixels in the main scanning direction×m2 pixels in the sub-scanning direction on the lower side of the target pixel a in the input image, and calculates the weighted average of the pixel values in the window W7. More specifically, if the window W7 is set as shown in FIG. 3A, the output value from the horizontal line detecting/lower portion averaging section 7 is obtained according to equation (6).

Output value of the horizontal line detecting/lower portion averaging section=

$$\{(X41+X51+X61)\times\alpha+(X42+X52+X62)\times\beta+(X43+X53+X63)\times$$

$$\gamma+(a+X54+X64)\times\gamma+(X45+X55+X65)\times\gamma+(X46+X56+X66)\times$$

$$\beta+(X47+X57+X67)\times\alpha\}/\zeta. \quad (6)$$

Note that the windows W6 and W7 are set such that there are no overlapping pixels and one of the windows contains the target pixel a. The windows W6 and W7 may be spaced apart from each other. In this case, however, the line memory used need to be increased in size. For this reason, as shown in FIG. 3A, the windows W6 and W7 are preferably set adjacent to each other.

The horizontal line detecting/differentiating section 8 calculates the absolute value of the difference between the output value from the horizontal line detecting/upper portion averaging section 6 and the output value from the horizontal line detecting/lower portion averaging section 7. More specifically, the output value from the horizontal line detecting/differentiating section 8 is obtained according to equation (7).

Output value of the horizontal line detecting/differentiating section=

|output value of the horizontal line detecting/upper portion averaging section− output value of the horizontal line detecting/lower portion averaging section|. (7)

FIG. 3B schematically shows the calculation performed by the horizontal line detecting/differentiating section 8. In FIG. 3B, the bullet indicates the position of the target pixel a.

The horizontal line/dot detecting section 9 sets a rectangular window W9 containing the target pixel a, which is constituted by k2 (k2=6 in this embodiment) pixels in the main scanning direction×j2 (j2=5 in this embodiment) pixels in the sub-scanning direction, and calculates the average of the absolute values of differential values between the left and right pixels in the window W9. More specifically, if the window W9 is set as shown in FIG. 3C, the output value from the horizontal line/dot detecting section 9 is obtained according to equation (8).

Output value of the horizontal line/dot detecting section=

$$(|X22-X23|+|X23-X24|+|X24-X25|+|X25-X26|+|X26-X27|$$

$$+|X32-X33|+|X33-X34|+|X34-X35|+|X35-X36|+|X36-X37|$$

$$+|X42-X43|+|X43-a|+|a-X45|+|X45-X46|+|X46-X47|+|$$

$$X52-X53|+|X53-X54|+|X54-X55|+|X55-X56|+|X56-X57|+|$$

$$X62-X63|+|X63-X64|+|X64-X65|+|X65-X66|+|X66-X67|)/25. \quad (8)$$

The horizontal line detecting/comparing section 10 subtracts the output value of the horizontal line/dot detecting section 9 from the output value of the horizontal line detecting/differentiating section 8, and compares the subtraction result with the second threshold value. If the subtraction result is larger than the second threshold value, the horizontal line detecting/comparing section 10 determines that the target pixel a or its neighboring pixel is a horizontal line image, and set the output value to "1" the subtraction result is not larger than the second threshold value, the horizontal line detecting/comparing section 10 determines that the pixel is not the horizontal line image, and sets the output value to "0".

Left-to-right downward slanting line detection will be described next with reference to FIGS. 4A to 4C. The left-to-right downward slanting line detecting/lower left oblique portion averaging section 11 sets a trapezoidal (or parallelogram) window W11 with the upper base corresponding to n3 (n3=2 in this embodiment) pixels in the main scanning direction, the lower base corresponding to m3 (m3=7 in this embodiment) pixels in the main scanning direction, and the height corresponding to h3 (h3=6 in this embodiment) in the sub-scanning direction on the lower left oblique side of the target pixel a in the input image, and calculates the weighted average of the pixel values in the window W11. More specifically, if the window W11 is set as shown in FIG. 4A, the output value from the left-to-right downward slanting line detecting/lower left oblique portion averaging section 11 is obtained according to equation (9).

Output value of the left-to-right downward slanting line detecting/lower left oblique portion averaging section=

$\{(X10+X11)\times\delta+X20\times\delta+(X21+X22)\times\beta+X30\times\delta+(X31+X32+$ $X33)\times\gamma+X40\times\delta+X41\times\alpha+(X42+X43+a)\times\gamma+(X50+X51)\times\delta+$ $X52\times\alpha+(X53+X54+X55)\times\gamma+(X60+X61+X62)\times\delta+X63\times\alpha+(X64+$ $X65+X66)\times\beta\}/\eta.$ (9)

In equation (9), δ is a weight like α, β, and γ. In this embodiment, δ=0. If all the weights α, β, γ, and δ are "1", η becomes equal to the number of pixels of 27 in the window W11. In this embodiment, however, since α=1, β=2, γ=3, and δ=0, η becomes equal to 40=α×(3, the number of pixels to be multiplied by the weight α)+β×(5, the number of pixels to be multiplied by the weight β)+γ×(9, the number of pixels to be multiplied by weight γ)+δ×(10, the number of pixels to be multiplied by weight δ).

The left-to-right downward slanting line detecting/upper right oblique portion averaging section 12 sets a trapezoidal (or parallelogram) window W12 with the upper base corresponding to m3 pixels in the main scanning direction, the lower base corresponding to n3 pixels in the main scanning direction, and the height corresponding to h3 pixels in the sub-scanning direction on the upper right oblique side of the target pixel a in the input image, and calculates the weighted average of the pixel values in the window W12. More specifically, if the window W12 is set as shown in FIG. 4A, an output value from the left-to-right downward slanting line detecting/upper right oblique portion averaging section 12 is obtained according to equation (10).

Output value of the left-to-right downward slanting line detecting/upper right oblique portion averaging section=

$\{(X68+X67)\times\beta+(X58+X57+X56)\times\gamma+X48\times\alpha+(X47+X46+$ $X45)\times\gamma+X38\times\delta+X37\times\alpha+(X36+X35+X34)\times\gamma+(X28+X27)\times\delta+$ $X26\times\alpha+(X25+X24+X23)\times\beta+(X18+X17+X15+X14+X13+X12)\times$ $\delta\}/\eta.$ (10)

Note that the windows W11 and W12 are set such that there are no overlapping pixels and one of the windows contains the target pixel a. The windows W11 and W12 may be spaced apart from each other. In this case, however, the line memory used need to be increased in size. For this reason, as shown in FIG. 4A, the windows W11 and W12 are preferably set adjacent to each other.

The left-to-right downward slanting line detecting/differentiating section 13 calculates the absolute value of the difference between the output value from the left-to-right downward slanting line detecting/lower left oblique portion averaging section 11 and the output value from the left-to-right downward slanting line detecting/upper right oblique portion averaging section 12. More specifically, the output value from the left-to-right downward slanting line detecting/differentiating section 13 is obtained according to equation (11).

Output value of the left-to-right downward slanting line detecting/differentiating section=

|output value of the left-to-right downward slanting line detecting/lower left oblique portion averaging section−output value of the left-to-right downward slanting line detecting/upper right oblique portion averaging section|. (11)

FIG. 4B schematically shows the calculation performed by the left-to-right downward slanting line detecting/differentiating section 13.

The left-to-right downward slanting line/dot detecting section 14 sets a rectangular window W14 containing the target pixel a, which is constituted by k3 (k3=6 in this embodiment) pixels in the main scanning direction×j3 (j3=6 in this embodiment) pixels in the sub-scanning direction, and calculates the average of the absolute values of differential values between the pixels in the lower right oblique direction in the window W14. More specifically, if the window W14 is set as shown in FIG. 4C, the output value from the left-to-right downward slanting line/dot detecting section 14 is obtained according to equation (12).

Output value of the left-to-right downward slanting line/dot detecting section=

$(|X22-X33|+|X23-X34|+|X24-X35|+|X25-X36|+|X26-X37|$ $+|X32-X43|+|X33-a|+|X34-X45|+|X35-X46|+|X36-X47|+$ $|X42-X53|+|X43-X54|+|a-X55|+|X45-X56|+|X46-X57|+|$ $X52-X63|+|X53-X64|+|X54-X65|+|X55-X66|+|X56-X67|+|$ $X62-X73|+|X63-X74|+|X64-X75|+|X65-X76|+|X66-X77|)/25.$ (12)

The left-to-right downward slanting line detecting/comparing section 15 subtracts the output value of the left-to-right downward slanting line/dot detecting section 14 from the output value of the left-to-right downward slanting line detecting/differentiating section 13, and compares the subtraction result with the third threshold value. If the subtraction result is larger than the third threshold value, the left-to-right downward slanting line detecting/comparing section 15 determines that the target pixel a or its neighboring pixel is a left-to-right downward slanting line image, and set the output value to "1". If the subtraction result is not larger than the third threshold value, the left-to-right downward slanting line detecting/comparing section 15 determines that the pixel is not the left-to-right downward slanting line image, and sets the output value to "0".

Left-to-right upward slanting line detection will be described next with reference to FIGS. 5A to 5C. The left-to-right upward slanting line detecting/upper left oblique portion averaging section 16 sets a trapezoidal (or parallelogram) window W16 with the upper base corresponding to n4 (n4=7 in this embodiment) pixels in the main scanning direction, the lower base corresponding to m4 (m4=2 in this embodiment) pixels in the main scanning direction, and the height corresponding to h4 (h4=6 in this embodiment) pixels in the substantially on the upper left oblique side of the target pixel a in the input image, and calculates the weighted average of the pixel values in the window W16. More specifically, if the window W16 is set as shown in FIG. 5A, the output value from the left-to-right upward slanting line detecting/upper left oblique portion averaging section 16 is obtained according to equation (13).

Output value of the left-to-right upward slanting line detecting/upper left oblique portion averaging section=

$\{(X60+X61)\times\beta+(X50+X51+X52)\times\gamma+X40\times\alpha+(X41+X42+X43)\times$ $\gamma+X30\times\delta+X31\times\alpha+(X32+X33+X34)\times\gamma+(X20+X21)\times\delta+X22\times$ $\alpha+(X23+X24+X25)\times\beta+(X10+X11+X12+X13+X14+X15+X16)\times$ $\delta\}/\theta.$ (13)

If all the weights α, β, γ, and δ are "1", θ becomes equal to the number of pixels, 27 in the window W16. In this embodiment, however, since α=1, β=2, γ=3, and δ=0, θ becomes equal to 40=α×(3, the number of pixels to be multiplied by the weight α)+β×(5, the number of pixels to be multiplied by the weight β)+γ×(9, the number of pixels to be multiplied by weight γ)+δ×(10, the number of pixels to be multiplied by weight δ).

The left-to-right upward slanting line detecting/lower right oblique portion averaging section 17 sets a trapezoidal (or parallelogram) window W17 with the upper base corresponding to m4 pixels in the main scanning direction, the lower base corresponding to n4 pixels in the main scanning direction, and the height corresponding to h4 pixels in the sub-scanning direction on the lower right oblique side of the target pixel a in the input image, and calculates the weighted average of the pixel values in the window W17. More specifically, if the window W17 is set as shown in FIG. 5A, the output value from the left-to-right upward slanting line detecting/lower right oblique portion averaging section 17 is obtained according to equation (14).

Output value of the left-to-right upward slanting line detecting/lower right oblique portion averaging section=

$\{(X18+X17)\times\delta+X28\times\delta+(X27+X26)\times\beta+X38\times\delta+(X37+X36+$ $X35)\times\gamma+X48\times\delta+X47\times\alpha+(X46+X45+a)\times\gamma+(X58+X57)\times\delta+$ $X56\times\alpha+(X55+X54+X53)\times\gamma+(X68+X67+X66)\times\delta+X65\times\alpha+$ $(X64+X63+X62)\times\}/\theta.$ (14)

Note that the windows W16 and W17 are set such that there are no overlapping pixels and one of the windows contains the target pixel a. The windows W10 and W17 may be spaced apart from each other. In this case, however, the line memory used need to be increased in size. For this reason, as shown in FIG. 5A, the windows W16 and W17 are preferably set adjacent to each other.

The left-to-right upward slanting line detecting/differentiating section 18 calculates the absolute value of the difference between the output value from the left-to-right upward slanting line detecting/upper left oblique portion averaging section 16 and the output value from the left-to-right upward slanting line detecting/lower right oblique portion averaging section 17. More specifically, the output value from the left-to-right upward slanting line detecting/differentiating section 18 is obtained according to equation (15).

Output value of the left-to-right upward slanting line detecting/differentiating section=

|output value of the left-to-right upward slanting line detecting/upper left oblique portion averaging section−output value of the left-to-right upward slanting line detecting/lower right oblique portion averaging section|. (15)

FIG. 5B schematically shows the calculation performed by the left-to-right upward slanting line detecting/differentiating section 18.

The left-to-right upward slanting line/dot detecting section 19 sets a rectangular window W19 containing the target pixel a, which is constituted by k4 (k4=6 in this embodiment) pixels in the main scanning direction×j4 (j4=6 in this embodiment) pixels in the sub-scanning direction, and calculates the average of the absolute values of differential values between the pixels in the upper right oblique direction in the window W19. More specifically, if the window W19 is set as shown in FIG. 5C, the output value from the left-to-right upward slanting line/dot detecting section 19 is obtained according to equation (16).

Output value of the left-to-right upward slanting line/ dot detecting section=

$|X22-X31|+|X23-X32|+|X24-X33|+|X26-X34|+|X26-X35|$ $+|X32-X41|+|X33-X42|+|X34-X43|+|X35-a|+|X36-X45|+$ $|X42-X51|+|X43-X52|+|a-X53|+|X45-X54|+|X46-X55|+|$ $$|X52-X61|+|X53-X62|+|X54-X63|+|X55-X64|+|X56-X65|+$$

$$|X62-X71|+|X63-X72|+|X64-X73|+|X65-X74|+|X66-X75|)/25. \quad (16)$$

The left-to-right upward slanting line detecting/comparing section 20 subtracts the output value of the left-to-right upward slanting line/dot detecting section 19 from the output value of the left-to-right upward slanting line detecting/differentiating section 18, and compares the subtraction result with the fourth threshold value. If the subtraction result is larger than the fourth threshold value, the left-to-right upward slanting line detecting/comparing section 20 determines that the target pixel a or its neighboring pixel is a left-to-right upward slanting line image, and set the output value to "1". If the subtraction result is not larger than the fourth threshold value, the left-to-right upward slanting line detecting/comparing section 20 determines that the pixel is not the left-to-right upward slanting line image, and sets the output value to "0".

If a line image is detected by at least one of the vertical line detecting/comparing section 5, horizontal line detecting/comparing section 10, left-to-right downward slanting line detecting/comparing section 15, and left-to-right upward slanting line detecting/comparing section 20, the line segment detecting/synthesizing section 21 determines that the target pixel a or its neighboring pixel is a line segment image. If no line image is detected by any of the vertical line detecting/comparing section 5, horizontal line detecting/comparing section 10, left-to-right downward slanting line detecting/comparing section 15, and left-to-right upward slanting line detecting/comparing section 20, the line segment detecting/synthesizing section 21 determines that the target pixel a or its neighboring pixel is a surface image.

More specifically, the line segment detecting/synthesizing section 21 calculates the logical OR between output values from the comparing sections 5, 10, 15, and 20. If at least one of these output values is "1", the line segment detecting/synthesizing section outputs an output value "1" indicating a line segment image. If all the output values from the comparing sections 5, 10, 15, and 20 are "0", the line segment detecting/synthesizing section 21 outputs an output value "0" indicating a surface image.

Next, description will be given of additional processing to the line segment result output from the line segment detecting/synthesizing section 21. A re-determining unit 100 serving as a main portion of the line segment detector according to the present invention is connected to an output from the line segment detecting/synthesizing section 21. The re-determining unit 100 includes the line segment result line-memory 23 comprising a plurality of lines.

Figures 6, 7:
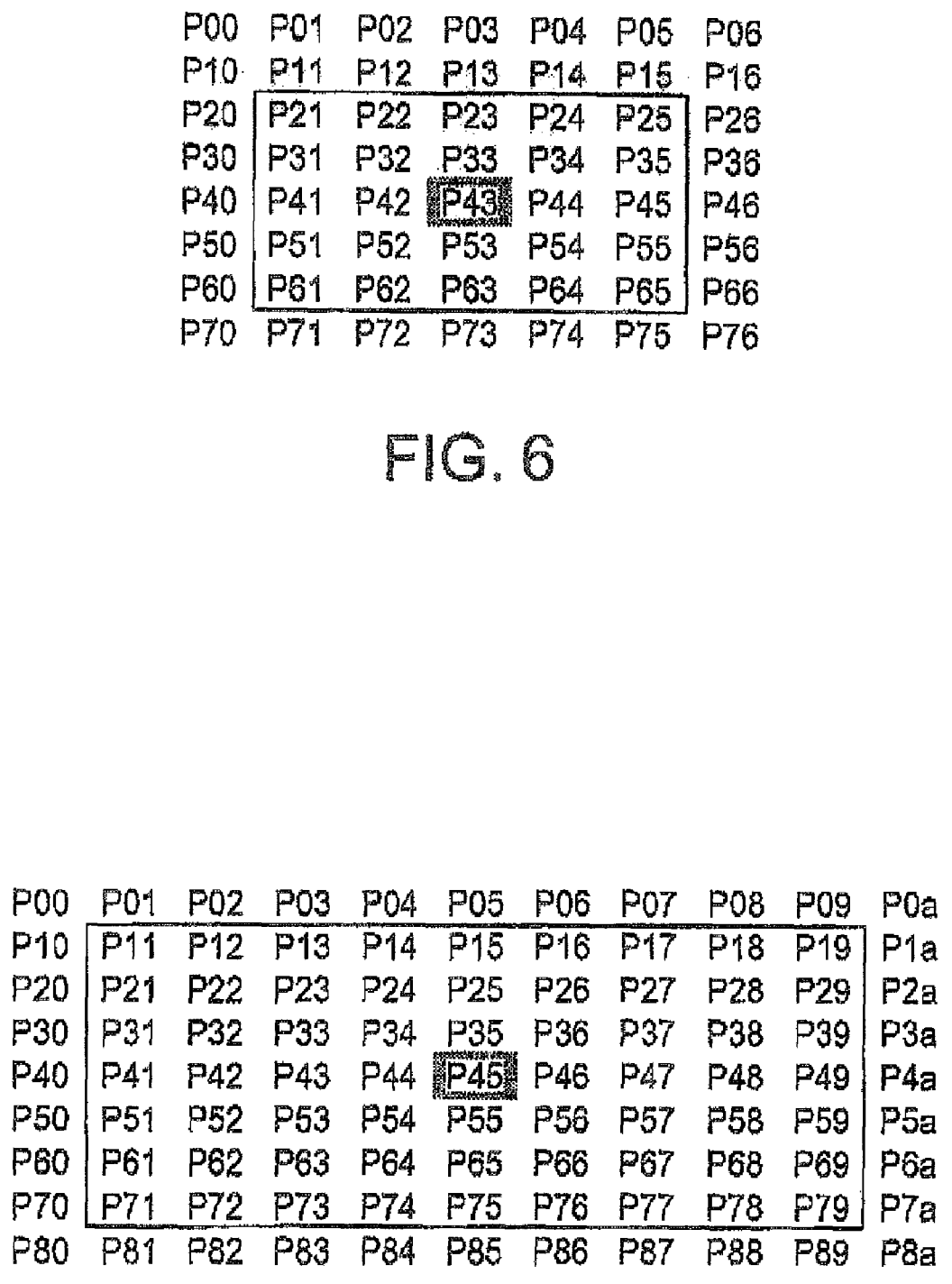

FIG. 6 shows the state of the window for counting the number of line segment pixels. The line segment result counting-section 24 counts the number of pixels determined as the line segment in the set window as shown in FIG. 6 in the detection result obtained as a result of the line segment detection for the input image. Herein, reference numerals P00 to P06, P10 to P16, P20 to P26, P30 to P36, P40 to P46, P50 to P56, P60 to P66, and P70 to P76 denote detection result output from the line segment detecting/synthesizing section 21. According to the first embodiment, since a window with a window size 5×5 is used, e.g., P43 is assumed as the target pixel and then the window is set as shown in FIG. 6 by a solid line. The window size can be arbitrarily set depending on processing accuracy and resources of the memory. Further, according to the first embodiment, the number of lines of the line segment result line-memory 23 may be four. A counted value CT from the line segment result counting-section 24 is compared with a fifth threshold value by the second line-segment detecting section 25 at the latter stage. If the counted value CT is not smaller than the fifth threshold value, the second line-segment detecting section 25 re-determines that the target pixel is the line segment. If the counted value CT is smaller than the fifth threshold value, the second line-segment detecting section 25 re-determines that the target pixel is not the line segment.

With the above processing, the detection result can be expanded by using the data from which the line segment is detected once. Although only the contour of the line segment is detected according to the conventional art, the detection result is expanded with the contour as center as mentioned above and thus the inside of the contour is provided. The expanding precision can be adjusted by setting the window size and the threshold value. Incidentally, the line segment result line-memory 23, the line segment result counting-section 24, and the second line-segment detecting section 25 may be referred to as a second line-segment detecting part in a lump.

Subsequently, the portion out of the erroneously-determined contour of the expanded detection result is subjected to correcting processing. The correcting processing includes third line-segment detecting processing. First, the average calculating section 26 calculates sets a window as shown in FIG. 7 to the input image and calculates the average of pixel values in the set window. In the first embodiment, a window size 9×7 is used for the third line-segment detecting processing. Obviously, the window size can be changed depending on characteristics of the input image and the detection precision. The calculated average is used for creating a sixth threshold value for the third line-segment detection by the threshold value generating section 27. Incidentally, the average calculating section 26 and the threshold value generating section 27 may be referred to as a threshold value generating part in a lump.

Specifically, the threshold value generating section 27 adds a variable V3 to the average calculated by the average calculating section 26, thereby setting the sixth threshold value THL3 for the third line-segment detection to the pixel, where MIN_THL3≦THL3≦MAX_THL3. The variable V3, minimum value MIN_THL3, and maximum value MAX_THL3 are determined depending on the characteristics of the input image and the detection precision.

Further, the pre-processing section 28 performs pre-processing of the input image so as to improve the detection precision in the third line-segment detection. In the first embodiment, the pre-processing section 28 performs MTF correction of the input image so as to emphasize features of the edge of the image. The MTF correction can be variously considered. Although sharpness adjustment that is generally used for image processing can be used, the image is divided for adjustment into a dot image (background image) portion and a line-segment image portion so as to further emphasize the features. The result from the line segment detecting/synthesizing section 21 can be used for determining the dot image (background image) portion and the line-segment image portion. Although a dedicated detecting circuit can be obviously provided, the result from the line segment detecting/synthesizing section 21 is used so as to reduce the resources according to the first embodiment.

In addition to the parameter division by using the dot image portion and the line-segment image portion, the pre-processing enables parameter division by using the features (in the vertical direction/horizontal direction/oblique direction) of the line segment and the dot.

Figures 8A, 8B, 8C, 8D, 8E, 8F, 8G, 8H:
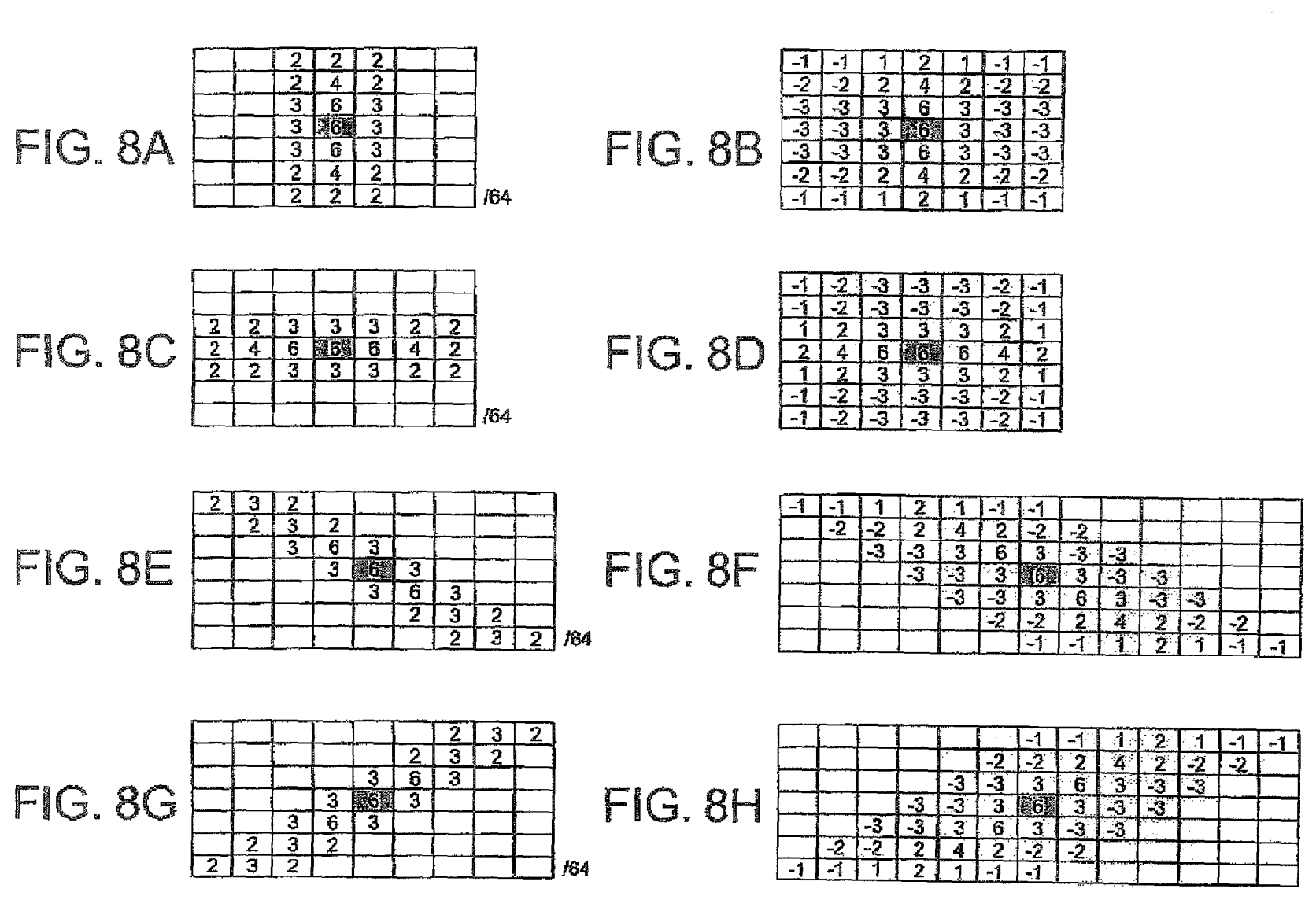
Figure 8J:
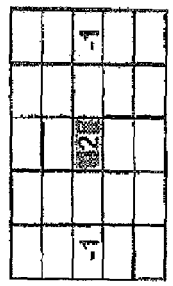
FIGS. 8A to 8P are diagrams for illustrating an example of an MTF correcting filter in pre-processing according to the present invention.
Figure 8L:
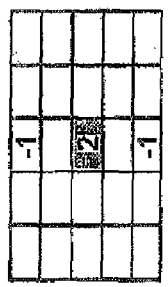
Figure 8N:
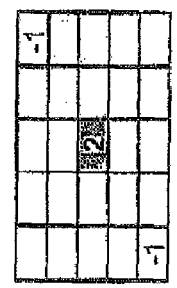
Figure 8P:
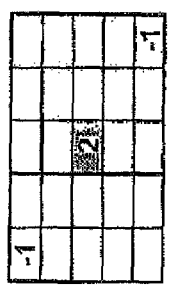
Figure 8I:
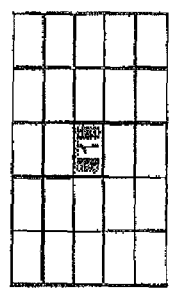
Figure 8K:
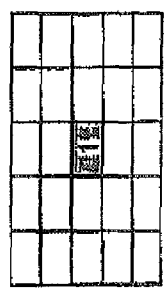
Figure 8M:
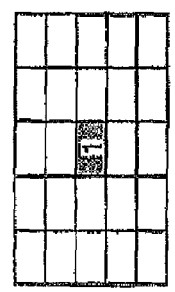
Figure 8O:
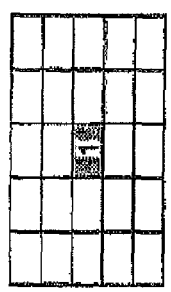

FIGS. 8A to 8P show filter examples of the MTF correction in the pre-processing section 28. The filters are set to the input images. Herein, there are vertical filters for dot image (FIGS. 5A and 8B), horizontal filter for dot images (FIGS. 8C and 8D), filters for left-to-right downward slanting dot image (FIGS. 8E and 8F), filters for left-to-right upward slanting dot image (FIGS. 8G and 8H), horizontal filters for line-segment image (FIGS. 8I and 8J), vertical filters for line-segment image (FIGS. 8K and 8L), left-to-right upward slating filters for line-segment image (FIGS. 8M and 8N), and left-to-right downward slanting filters for line-segment image (FIGS. 8O and 8P).

With the filter, a coefficient in the filter is multiplied to the pixel corresponding to the filter and values in all the filters are added, thereby obtaining the value. A coefficient value without description of numeral is set as 0. Each filter has a filter for center value and a filter for difference value and the MTF correction is executed with the following expression.

Pixel value after *MTF* correction=Center value+(difference value×*MTF* correction coefficient).

Advantageously, the MTF correction coefficients are divided into that for dot and that for line segment. The filters shown in FIGS. 8A to 8P are examples and the filter size and coefficient in the filter can be obviously set depending on the precision and features. Further, the first embodiment shows examples of the MTF correction and, obviously, the determination as whether or not the MTF correction coefficients are divided by using the feature of the image in the examples and another general correction can be arbitrarily set.

The third line-segment detecting section 29 performs a third line segment detection with the pixel value after the pre-processing obtained with the above processing, the sixth threshold value obtained by the threshold value generating section 27, and the detection result from the second line-segment detecting section 25. In this method, if the result of the second line-segment detection of the pixels is a line segment, it is determined, when the pixel value after the pre-processing is not larger than the sixth threshold value THL3, that is a line image and, when the pixel value is larger than the sixth threshold value THL3, that is a surface image.

Figure 9:
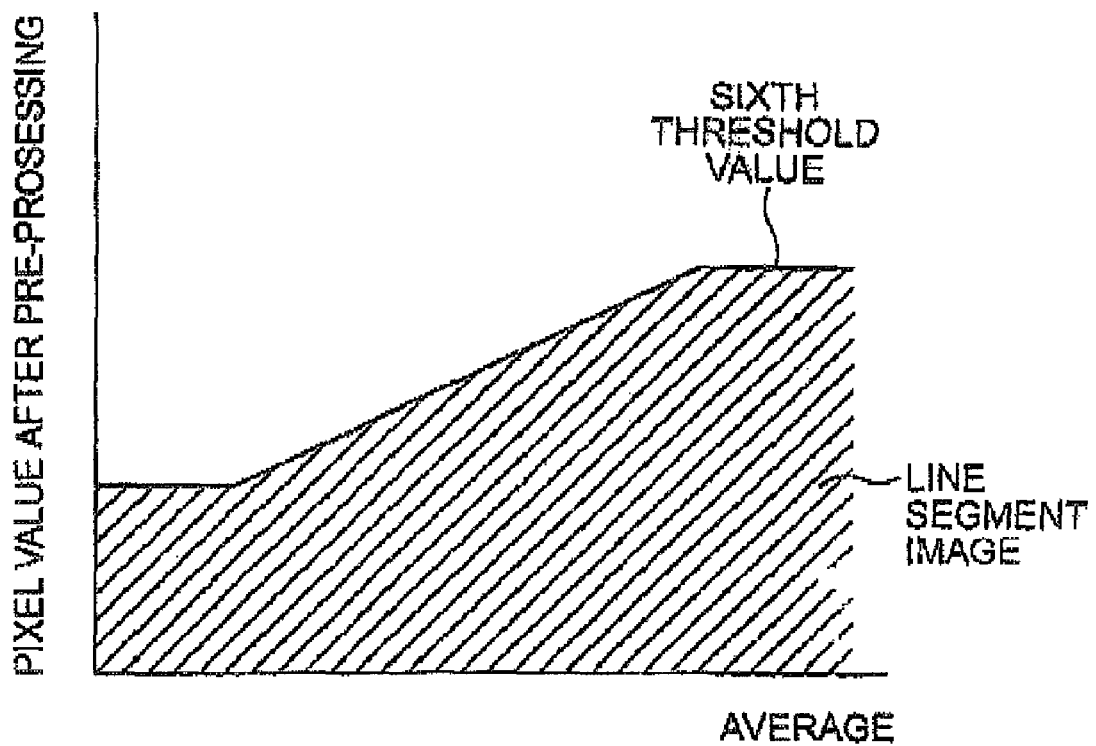
FIG. 9 is a diagram showing a relationship among the average in third line-segment detecting processing, a pixel value after the pre-processing, and a threshold value.

FIG. 9 shows a relationship between the average, the pixel value after the pre-processing, and the sixth threshold value. With these processing, it is determined with respect to the detection result of forced expansion that the content of the character or line is a line and the detection result can be simultaneously reformed without erroneous detection.

The detection result correcting section 30-2 corrects the detection result (determination result) of the third line-segment detecting section 29. The detection result indicates that the corresponding pixel in the input image is the line segment. Basically, a one-pixel isolated point and two-pixel isolated points are not the line segment. Therefore, in this case, the detection result is assumed that the dot is erroneously determined and the detection result correcting section 30-2 thus removes the above isolated points and corrects the detection result. In order to remove the isolated point, the detection result line memory 30-1 delays the line and the detection result correcting section 30-2 sets a window with size of 3×3 or 4×4 corresponding to the isolated point to be removed and searches and corrects a desired pattern (isolated point).

Although the one-pixel isolated point and two-pixel isolated points are removed according to the first embodiment, a pattern other than the foregoing obviously determined not as the line segment is similarly removed, thereby preventing the erroneous detection and improving the advantages of the subsequent image processing and image compression. Further, the determination result is subjected to smoothing and notch removal in addition to the prevention of the erroneous determination so as to correct the detection result. Accordingly, the advantages of the image processing and image compression can be further improved.

Hereinbelow, a description will be given of the advantages of the line segment detector according to the first embodiment.

In the case of detecting the line segment in the image mixedly having the dot and the line segment, according to the conventional method and with the conventional apparatus, only the contour of the character and line determined as the line segment is detected. On the other hand, according to the first embodiment, even the contents of the character and line can be detected as the line segment without numerous resources. As a consequence, the character can be extracted not only as the contour but also the character. For example, the performance such as the image quality and the compression efficiency can be improved in the image compression of the object encoding, e.g., JBIG2, MRC, and JPEG2000-Part 6. Further, the detection result is corrected, thereby improving the precision of the detection result. Furthermore, a noise component such as the isolated point is removed, thereby improving the image quality and the efficiency of the image compression.

By re-determining, depending on the counted value of the number of line-segment pixels in the window at the portion determined as the line segment, if there is the total number of line-segment pixels not smaller than a specific threshold value, that the detection result is the line segment and, if there is the total number of line-segment pixels smaller than the specific threshold value, that the detection result is not the line segment, the circumference of the line segment result is expanded and the portion of the line segment is widened. Thus, the portion of only the contour is blurred and the inside of the contour of the character and the line is formed. However, only with this, the detection result including the expansion even to the outside of the contour includes the erroneous detection and thin-line processing (re-forming processing) is therefore executed by further detecting processing. Specifically, with respect to the pixel determined as the line-segment image in the second line-segment detection, the pixel value after the pre-processing is compared with the sixth threshold value and, it is determined, when the pixel value is not larger than the sixth threshold value, that the detection result is the line-segment image and, when the pixel value is larger than the sixth threshold value, that the detection result is not the line-segment image. Hence, the content of the character and line remains and the erroneous detected portion of the portion outside of the contour is deleted. With the above processing, a desired division result can be obtained.

Further, the additional correction of the result enables the improvement of the advantages in the post-processing including the subsequent image processing and image compression because of the correction for removing the detection result that is not obviously the line segment, e.g., the detection result of the line segment that is the isolated point. Consequently, the precision of the division result is improved and, e.g., in the image compression, the isolated point corresponding to the noise component is removed, thereby improving the compression performance.

Second Embodiment

According to the first embodiment, a monochrome gray image is used. However, the present invention can be applied to a color image.

Figure 10:
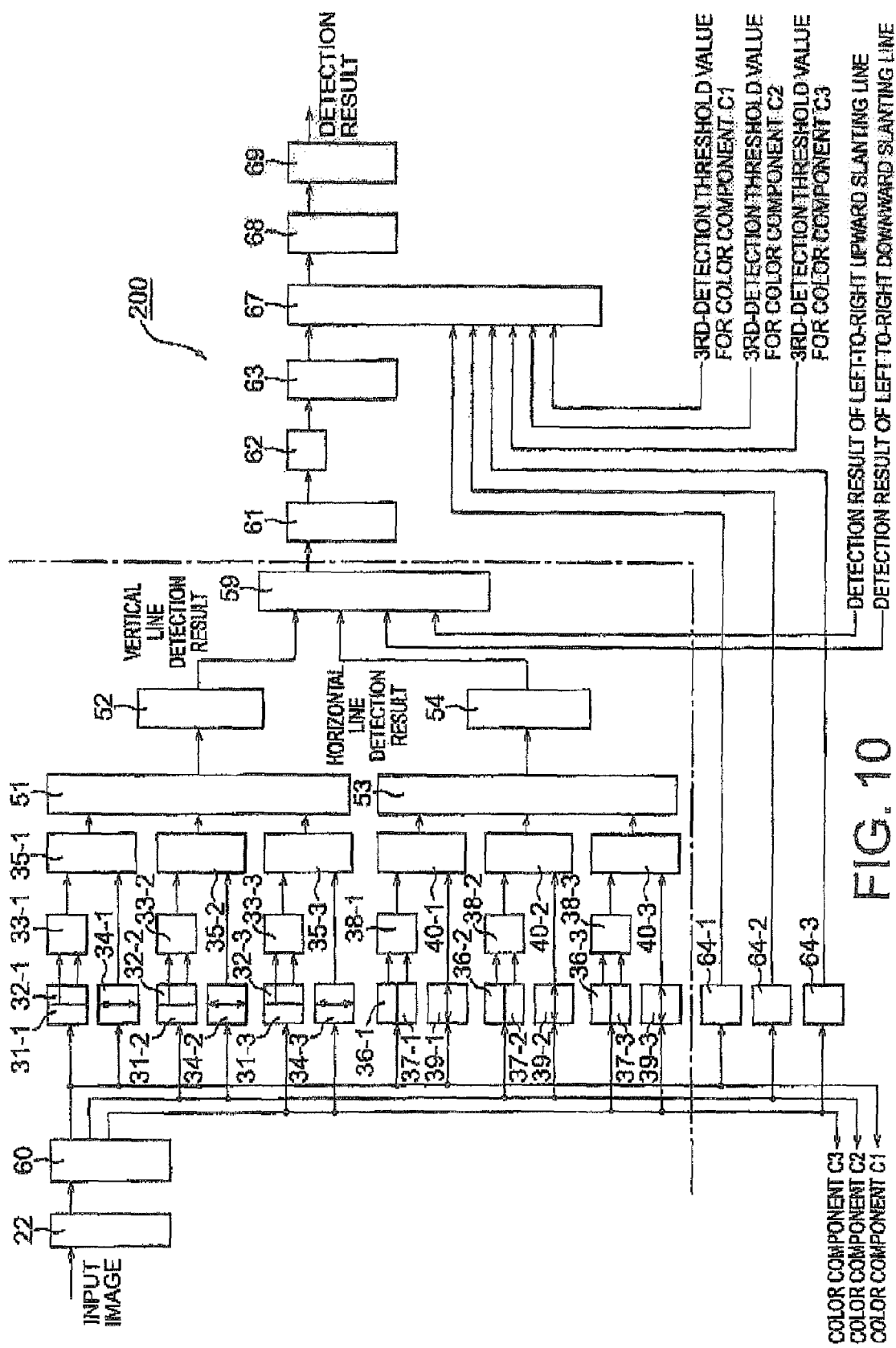
FIG. 10 is a block diagram showing one-half structure of a line segment detector according to the second embodiment of the present invention.
Figure 11:
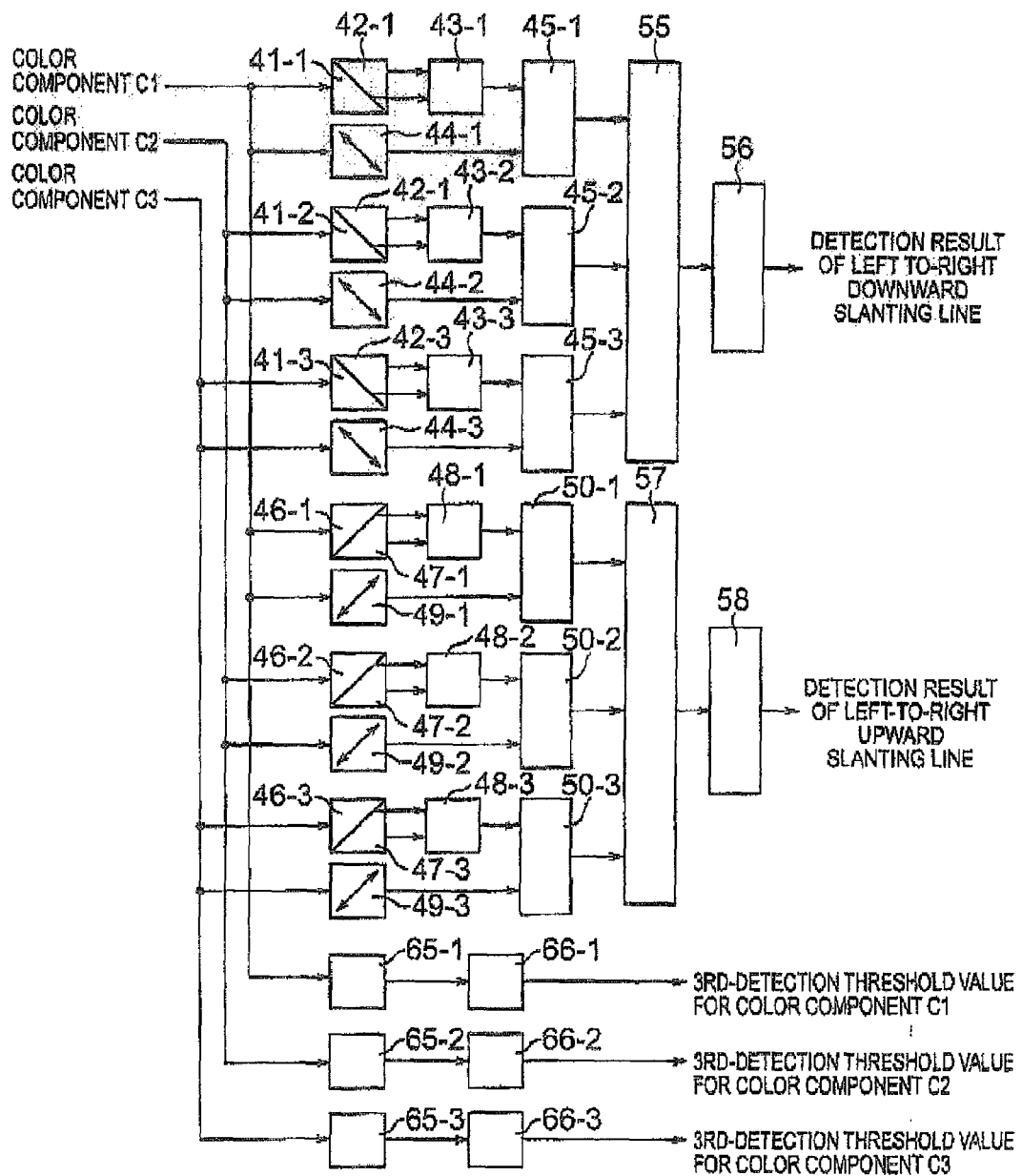
FIG. 11 is a block diagram showing the other-half structure of the line segment detector according to the second embodiment of the present invention.

FIGS. 10 and 11 are block diagrams showing a line segment detector when the present invention is applied to the color image according to the second embodiment of the present invention. FIG. 10 mainly shows the structure for detecting a vertical line and a horizontal line, and FIG. 11 mainly shows the structure for detecting a left-to-right upward slanting line and a left-to-right downward slanting line.

Referring to FIG. 10, a color space conversion section 60 converts color image data of a plurality of lines output from the line memory 22 into color components C1, C2, and C3. Herein, the color components C1, C2, and C3 include color spaces such as Lab, YCbCr, and sYCbCr defined by International Commission on Illumination (CIE). Further, with respect to a positional relationship between the color space conversion section 60 and the line memory 22, data subjected to color space conversion may be input to the line memory.

At first, vertical line detection will be described. Vertical line detecting/left portion averaging sections 31-1, 31-2, and 31-3 are provided in correspondence with the color components C1, C2, and C3 of the input image and execute the same processing as that executed by the vertical line detecting/left portion averaging section 1 (FIG. 1) with respect to the corresponding color components. For example, the vertical line detecting/left portion averaging section 31-1 sets, as mentioned in FIG. 2B, a window W1 on the left side of a target pixel a in the color component C1 of the input image, and calculates the weighted average of the pixel values in the window W1.

Vertical line detecting/right portion averaging sections 32-1, 32-2, and 32-3 are provided in correspondence with the color components C1, C2, and C3 of the input image, and execute the same processing as that executed by the vertical line detecting/right portion averaging section 2 (FIG. 1) with respect to the corresponding color components. For example, the vertical line detecting/right portion averaging section 32-1 sets, as mentioned in FIG. 2B, a window W2 on the right side of the target pixel a in the color component C1 of the input image, and calculates the weighted average of the pixel values in the window W2.

Vertical line detecting/differentiating sections 33-1, 33-2, and 33-3 are provided in correspondence with the color components C1, C2, and C3 of the input image, and execute the same processing as that executed by the vertical line detecting/differentiating section 3 (FIG. 1) with respect to the corresponding color components. For example, the vertical line detecting/differentiating section 33-1 calculates the absolute value of the difference between the output value from the vertical line detecting/left portion averaging section 31-1 and the output value from the vertical line detecting/right portion averaging section 32-1.

Vertical line/dot detecting sections 34-1, 34-2, and 34-3 are provided in correspondence with the color components C1, C2, and C3 of the input image, and execute the same processing as that executed by the vertical line/dot detecting section 4 (FIG. 1) with respect to the corresponding color components. For example, the vertical line/dot detecting section 34-1 sets a window W4 containing the target pixel a in the color component C1 of the input image, and calculates the average of the absolute values of differential values between upper and lower pixels in the window W4.

Color image vertical line differential amount calculating sections 35-1, 35-2, and 35-3 are provided in correspondence with the color components C1, C2, and C3. The color image vertical line differential amount calculating section 35-1 subtracts the output value of the vertical line/dot detecting section 34-1 from the output value of the vertical line detecting/differentiating section 33-1. The color image vertical line differential amount calculating section 35-2 subtracts the output value of the vertical line/dot detecting section 34-2 from the output value of the vertical line detecting/differentiating section 33-2. The color image vertical line differential amount calculating sections 36-3 subtracts the output value of the vertical line/dot detecting section 34-3 from the output value of the vertical line detecting/differentiating section 33-3. The subtraction results obtained by the color image vertical line differential amount calculating sections 35-1, 35-2, and 35-3 are output to a color image vertical line differential amount/distance calculating section 51.

Supplied with the outputs of the color image vertical line differential amount calculating sections 35-1 to 35-3, the color image vertical line differential amount/distance calculating section 51 calculates the distance between the windows W1 and W2 in a 3D color space. The distance calculated by the color image vertical line differential amount/distance calculating section 51 may be a Euclidean distance or another distance such as a Pascal distance.

A color image vertical line detecting/comparing section 52 compares the output value from the color image vertical line differential amount/distance calculating section 51 with a seventh threshold value (threshold value for detecting the vertical line) and determines, when the output value is larger than the seventh threshold value, that the target pixel or neighboring pixel thereof is a vertical line image, when the output value is not larger than the seventh threshold value, that the target pixel or neighboring pixel thereof is not the vertical line image. Further, the color image vertical line detecting/comparing section 52 compares, when the target pixel or neighboring pixel thereof is the vertical line image, the calculation result of the color image vertical line differential amount calculating section 35-1 with an eighth threshold value for the color component C1, when the calculation result is larger than the eighth threshold value, that the target pixel or neighboring pixel thereof is the vertical line image for the color component C1. On the other hand, when the calculation result is not larger than the eighth threshold value, the color image vertical line detecting/comparing section 52 compares the calculation result of the color image vertical line differential amount calculating section 35-2 for the color component C2 with the calculation result of the color image vertical line differential amount calculating section 35-3 for the color component C3. As the comparison result, when the calculation result of the color image vertical line differential amount calculating section 35-2 is larger than the calculation result of the color image vertical line differential amount calculating section 35-3 for the color component C3, the color image vertical line detecting/comparing section 52 determines that the vertical line image is that for the color component C2 and determines, when the calculation result of the color image vertical line differential amount calculating section 35-2 is not larger than the calculation result of the color image vertical line differential amount calculating section 35-3 for the color component C3, that the vertical line image is that for the color component C3. The above-mentioned components for detecting the vertical line may collectively be called a vertical line detecting part.

Herein, the color component C1 that is to be first compared with the seventh threshold value is assumed as a luminance component of the color space, and the color components C2 and C3 are assumed as hue components. The color image vertical line detecting/comparing section 52 outputs "11" when the vertical line image is that for the color component C1, "10" when the vertical line image is that for the color component C2, "01" when the vertical line image is that for the color component C3, and "00" when the image is not the vertical line image. These output values may be output as other proper values when they are unified in the whole system.

Next, horizontal line detection will be described. Horizontal line detecting/upper portion averaging sections 36-1, 36-2, and 36-3 are provided in correspondence with the color components C1, C2, and C3 of the input image and execute the same processing as that executed by the horizontal line detecting/upper portion averaging section 6 (FIG. 1) with respect to the corresponding color components. For example, the horizontal line detecting/upper portion averaging section 36-1 sets, as mentioned in FIG. 3A, a window W6 on the upper side of the target pixel a in the color component C1 of the input image, and calculates the weighted average of the pixel values in the window W6.

Horizontal line detecting/lower portion averaging sections 37-1, 37-2, and 37-3 are provided in correspondence with the color components C1, C2, and C3 of the input image, and execute the same processing as that executed by the horizontal line detecting/lower portion averaging section 7 (FIG. 1) with respect to the corresponding color components. For example, the horizontal line detecting/lower portion averaging section 37-1 sets, as mentioned in FIG. 3A, a window W7 on the lower side of the target pixel A in the color component C1 of the input image, and calculates the weighted average of the pixel values in the window W7.

Horizontal line detecting/differentiating sections 38-1, 38-2, and 38-3 are provided in correspondence with the color components C1, C2, and C3 of the input image, and execute the same processing as that executed by the horizontal line detecting/differentiating section 8 (FIG. 1) with respect to the corresponding color components. For example, the horizontal line detecting/differentiating section 38-1 calculates the absolute value of the difference between the output value from the horizontal line detecting/upper portion averaging section 36-1 and the output value from the horizontal line detecting/lower portion averaging section 37-1.

Horizontal line/dot detecting sections 39-1, 39-2, and 39-3 are provided in correspondence with the color components C1, C2, and C3 of the input image, and execute the same processing as that executed by the horizontal line/dot detecting section 9 (FIG. 1) with respect to the corresponding color components. For example, the horizontal line/dot detecting section 39-1 sets, as mentioned in FIG. 3C, a window W9 containing the target pixel a in the color component C1 of the input image, and calculates the average of the absolute values of differential values between left and right pixels in the window W9.

Color image horizontal line differential amount calculating sections 40-1, 40-2, and 40-3 are provided in correspondence with the color components C1, C2, and C3. The color image horizontal line differential amount calculating section 40-1 subtracts the output value of the horizontal line/dot detecting section 39-1 from the output value of the horizontal line detecting/differentiating section 38-1. The color image horizontal line differential amount calculating section 40-2 subtracts the output value of the horizontal line/dot detecting section 39-2 from the output value of the horizontal line detecting/differentiating section 38-2. The color image horizontal line differential amount calculating section 40-3 subtracts the output value of the horizontal line/dot detecting section 39-3 from the output value of the horizontal line detecting/differentiating section 38-3. The subtraction results obtained by the color image horizontal line differential amount calculating sections 40-1, 40-2, and 40-3 are output to a color image horizontal line differential amount/distance calculating section 53.

Supplied with the outputs of the color image horizontal line differential amount calculating sections 40-1 to 40-3, the color image horizontal line differential amount/distance calculating section 53 calculates the distance between the windows W6 and W7 in a 3D color space.

A color image horizontal line detecting/comparing section 54 compares the output value from the color image horizontal line differential amount/distance calculating section 53 with a ninth threshold value (threshold value for detecting the horizontal line). When the output value is larger than the ninth threshold value, the color image horizontal line detecting/comparing section 54 determines that the target pixel or neighboring pixel thereof is a horizontal line image and further determines, when the output value is not larger than the ninth threshold value, that the target pixel or neighboring pixel thereof is not the horizontal line image. Further, when it is determined that the target pixel or neighboring pixel thereof is the horizontal line image, the color image horizontal line detecting/comparing section 54 compares the calculation result of the color image horizontal line differential amount calculating section 40-1 for the color component C1 with a tenth threshold value. When it is determined that the calculation result is larger than the tenth threshold value, the color image horizontal line detecting/comparing section 54 determines that the target pixel or neighboring pixel thereof is the horizontal line image for the color component C1. On the other hand, when the calculation result is not larger than the tenth threshold value, the color image horizontal line detecting/comparing section 54 compares the calculation result of the color image horizontal line differential amount calculating section 40-2 for the color component C2 with the calculation result of the color image horizontal line differential amount calculating section 40-3 for the color component C3. When the calculation result of the color image horizontal line differential amount calculating section 40-2 is larger than the calculation result of the color image horizontal line differential amount calculating section 40-3, the color image horizontal line detecting/comparing section 54 determines that the target pixel or neighboring pixel thereof is the horizontal line image for the color component C2 and further determines, when the calculation result of the color image horizontal line differential amount calculating section 40-2 is not larger than the calculation result of the color image horizontal line differential amount calculating section 40-3, that the target pixel or neighboring pixel thereof is the horizontal line image for the color component C3.

The color image horizontal line detecting/comparing section 54 outputs "11" when the horizontal line image is that for the color component C1, "10" when the horizontal line image is that for the color component C2, "01" when the horizontal line image is that for the color component C3, and "00" when the target pixel or neighboring pixel is not the horizontal line image. The above-mentioned components for detecting the horizontal line may collectively be called a horizontal line detecting part.

Left-to-right downward slanting line detection will be described with reference to FIG. 11. Left-to-right downward slanting line detecting/lower left oblique portion averaging sections 41-1, 41-2, and 41-3 are provided in correspondence with the color components C1, C2, and C3 of the input image, and execute the same processing as that executed by the left-to-right downward slanting line detecting/lower left oblique portion averaging section 11 (FIG. 1) with respect to the corresponding color components. For example, the leftto-right downward slanting line detecting/lower left oblique portion averaging section 41-1 sets, as mentioned in FIG. 4A, a window W11 on the lower left oblique side of the target pixel a in the color component C1 of the input image, and calculates the weighted average of the pixel values in the window W11.

Left-to-right downward slanting line detecting/upper right oblique portion averaging sections 42-1, 42-2, and 42-3 are provided in correspondence with the color components C1, C2, and C3 of the input image, and execute the same processing as that executed by the left-to-right downward slanting line detecting/upper right oblique portion averaging section 12 (FIG. 1) with respect to the corresponding color components. For example, the left-to-right downward slanting line detecting/upper right oblique portion averaging section 42-1 sets, as mentioned in FIG. 4A, a window W12 on the upper right oblique side of the target pixel a in the color component C1 of the input image, and calculates the weighted average of the pixel values in the window W12.

Left-to-right downward slanting line detecting/differentiating sections 43-1, 43-2, and 43-3 are provided in correspondence with the color components C1, C2, and C3 of the input image, and execute the same processing as that executed by the left-to-right downward slanting line detecting/differentiating section 13 (FIG. 1) with respect to the corresponding color components. For example, the left-to-right downward slanting line detecting/differentiating section 43-1 calculates the absolute value of the difference between the output value from the left-to-right downward slanting line detecting/lower left oblique portion averaging section 41-1 and the output value from the left-to-right downward slanting line detecting/upper right oblique portion averaging section 42-1.

Left-to-right downward slanting line/dot detecting sections 44-1, 44-2, and 44-3 are provided in correspondence with the color components C1, C2, and C3 of the input image, and execute the same processing as that executed by the left-to-right downward slanting line/dot detecting section 14 (FIG. 1) with respect to the corresponding color components. For example, the left-to-right downward slanting line/dot detecting section 44-1 sets, as mentioned in FIG. 4C, a window W14 containing the target pixel a in the color component C1 of the input image, and calculates the average of the absolute values of differential values between left and right pixels in the window W14.

Color image left-to-right downward slanting line differential amount calculating sections 45-1, 45-2, and 45-3 are provided in correspondence with the color components C1, C2, and C3. The color image left-to-right downward slanting line differential amount calculating section 45-1 subtracts the output value of the left-to-right downward slanting line/dot detecting section 44-1 from the output value of the left-to-right downward slanting line detecting/differentiating section 43-1. The color image left-to-right downward slanting line differential amount calculating section 45-2 subtracts the output value of the left-to-right downward slanting line/dot detecting section 44-2 from the output value of the left-to-right downward slanting line detecting/differentiating section 43-2. The color image left-to-right downward slanting line differential amount calculating section 45-3 subtracts the output value of the left-to-right downward slanting line/dot detecting section 44-3 from the output value of the left-to-right downward slanting line detecting/differentiating section 43-3. The outputs from the color image left-to-right downward slanting line differential amount calculating sections 45-1, 45-2, and 45-3 are output to a color image left-to-right downward slanting line differential amount/distance calculating section 55.

The color image left-to-right downward slanting line differential amount/distance calculating section 55 calculates the distance between the windows W11 and W12 in a 3D color space, on the basis of the respective output values from the color image left-to-right downward slanting line differential amount calculating sections 45-1, 45-2, and 45-3.

A color image left-to-right downward slanting line detecting/comparing section 56 compares the output value from the color image left-to-right downward slanting line differential amount/distance calculating section 55 with an eleventh threshold value (threshold value for detecting the left-to-right downward slanting line). The color image left-to-right downward slanting line detecting/comparing section 56 determines, when the output value is larger than the eleventh threshold value, that the target pixel or neighboring pixel thereof is a left-to-right downward slanting-line image and, when the output value is not larger than the eleventh threshold value, that the target pixel or neighboring pixel thereof is not the left-to-right downward slanting-line image. Further, the color image left-to-right downward slanting line detecting/comparing section 56 compares the calculation result of the color image left-to-right downward slanting line differential amount calculating section 45-1 with a twelfth threshold value for the color component C1 when it is determined that the target pixel or neighboring pixel thereof is the left-to-right downward slanting-line image, and that the target pixel or neighboring pixel thereof is the left-to-right downward slanting-line image for the color component C1 when the calculation result is larger than the twelfth threshold value. On the other hand, when the calculation result is not larger than the twelfth threshold value, the color image left-to-right downward slanting line detecting/comparing section 56 compares the calculation result of the color image left-to-right downward slanting line differential amount calculating section 45-2 for the color component C2 with the calculation result of the color image left-to-right downward slanting line differential amount calculating section 45-3 for the color component C3. As the comparison result, the color image left-to-right downward slanting line detecting/comparing section 56 determines, when the calculation result of the color image left-to-right downward slanting line differential amount calculating section 45-2 is larger than the calculation result of the color image left-to-right downward slanting line differential amount calculating section 45-3, that the target pixel or neighboring pixel thereof is the left-to-right downward-slanting line image for the color component C2 and, when the calculation result of the color image left-to-right downward slanting line differential amount calculating section 45-2 is not larger than the calculation result of the color image left-to-right downward slanting line differential amount calculating section 45-3, that the target pixel or neighboring pixel thereof is the left-to-right downward-slanting line image for the color component c3.

The color image left-to-right downward slanting line detecting/comparing section 66 outputs "11" when the target pixel or neighboring pixel thereof is the left-to-right downward-slanting line image for the color component C1, "10" when the target pixel or neighboring pixel thereof is the left-to-right downward-slanting line image for the color component C2, "01" when the target pixel or neighboring pixel thereof is the left-to-right downward-slanting line image for the color component C3, and "00" when the target pixel or neighboring pixel thereof is not the left-to-right downward-slanting line image. The above-mentioned components for detecting the left-to-right downward-slanting line may collectively be called a left-to-right downward-slanting line detecting part.

Next, left-to-right upward slanting line detection will be described. Left-to-right upward slanting line detecting/upper left oblique portion averaging sections 46-1, 46-2, and 46-3 are provided in correspondence with the color components C1, C2, and C3 of the input image, and execute the same processing as that executed by the left-to-right upward slanting line detecting/upper left oblique portion averaging section 16 (FIG. 1) with respect to the corresponding color components. For example, the left-to-right upward slanting line detecting/upper left oblique portion averaging section 46-1 sets, as mentioned in FIG. 5A, a window W16 on the upper left oblique side of the target pixel a in the color component C1 of the input image, and calculates the weighted average of the pixel values in the window W16.

Left-to-right upward slanting line detecting/lower right oblique portion averaging sections 47-1, 47-2, and 47-3 are provided in correspondence with the color components C1, C2, and C3 of the input image, and execute the same processing as that executed by the left-to-right upward slanting line detecting/lower right oblique portion averaging section 17 (FIG. 1) with respect to the corresponding color components. For example, the left-to-right upward slanting line detecting/lower right oblique portion averaging section 47-1 sets, as mentioned in FIG. 5A, a window W17 on the lower right oblique side of the target pixel a in the color component C1 of the input image, and calculates the weighted average of the pixel values in the window W17.

Left-to-right upward slanting line detecting/differentiating sections 48-1, 48-2, and 48-3 are provided in correspondence with the color components C1, C2, and C3 of the input image, and execute the same processing as that executed by the left-to-right upward slanting line detecting/differentiating section 18 (FIG. 1) with respect to the corresponding color components. For example, the left-to-right upward slanting line detecting/differentiating section 48-1 calculates the absolute value of the difference between the output value from the left-to-right upward slanting line detecting/upper left oblique portion averaging section 46-1 and the output value from the left-to-right upward slanting line detecting/lower right oblique portion averaging section 47-1.

Left-to-right upward slanting line/dot detecting sections 49-1, 49-2, and 49-3 are provided in correspondence with the color components C1, C2, and C3 of the input image, and execute the same processing as that executed by the left-to-right upward slanting line/dot detecting section 19 (FIG. 1) with respect to the corresponding color components. For example, the left-to-right upward slanting line/dot detecting section 49-1 sets, as mentioned in FIG. 5C, a window W19 containing the target pixel a in the color component C1 of the input image, and calculates the average of the absolute values of differential values between left and right pixels in the window W19.

Color image left-to-right upward slanting line differential amount calculating sections 50-1, 50-2, and 50-3 are provided in correspondence with the color components C1, C2, and C3. The color image left-to-right upward slanting line differential amount calculating section 50-1 subtracts the output value of the left-to-right upward slanting line/dot detecting section 49-1 from the output value of the left-to-right upward slanting line detecting/differentiating section 48-1. The color image left-to-right upward slanting line differential amount calculating section 50-2 subtracts the output value of the left-to-right upward slanting line/dot detecting section 49-2 from the output value of the left-to-right upward slanting line detecting/differentiating section 48-2. The color image left-to-right upward slanting line differential amount calculating section 50-3 subtracts the output value of the left-to-right upward slanting line/dot detecting section 49-3 from the output value of the left-to-right upward slanting line detecting/differentiating section 48-3. The subtraction results obtained by the color image left-to-right upward slanting line differential amount calculating sections 50-1, 50-2 and 50-3 are output to a color image left-to-right upward slanting line differential amount/distance calculating section 57.

The color image left-to-right upward slanting line differential amount/distance calculating section 57 calculates the distance between the windows W16 and W17 in a 3D color space, on the basis of the respective output values from the color image left-to-right upward slanting line differential amount calculating sections 50-1 to 50-3.

A color image left-to-right upward slanting line detecting/comparing section 58 compares the output value of the color image left-to-right upward slanting line differential amount/distance calculating section 57 with a thirteenth threshold value (threshold value for detecting the left-to-right upward slanting line). Further, the color image left-to-right upward slanting line detecting/comparing section 58 determines, when the output value is larger than the thirteenth threshold value, that the target pixel or neighboring pixel thereof is a left-to-right upward-slanting line image and, when the output value is not larger than the thirteenth threshold value, that the target pixel or neighboring pixel thereof is not the left-to-right upward-slanting line image. Furthermore, when it is determined that the target pixel or neighboring pixel thereof is the left-to-right upward-slanting line image, the color image left-to-right upward slanting line detecting/comparing section 58 compares the calculation result of the color image left-to-right upward slanting line differential amount calculating section 48-1 with a fourteenth threshold value for the color component C1. When it is determined that the calculation result is larger than the fourteenth threshold value, the color image left-to-right upward slanting line detecting/comparing section 58 determines that the target pixel or neighboring pixel thereof is the left-to-right upward-slanting line image for the color component C1. On the other hand, when it is determined that the calculation result is not larger than the fourteenth threshold value, the color image left-to-right upward slanting line detecting/comparing section 58 compares the calculation result of the color image left-to-right upward slanting line differential amount calculating section 48-2 for the color component C2 with the calculation result of the color image left-to-right upward slanting line differential amount calculating section 48-3 for the color component C3. As the comparison result, the color image left-to-right upward slanting line detecting/comparing section 58 determines, when the calculation result of the color image left-to-right upward slanting line differential amount calculating section 48-2 is larger than the calculation result of the color image left-to-right upward slanting line differential amount calculating section 48-3, that the target pixel or neighboring pixel thereof is the left-to-right upward-slanting line image for the color component C2 and, when the calculation result of the color image left-to-right upward slanting line differential amount calculating section 48-2 is not larger than the calculation result of the color image left-to-right upward slanting line differential amount calculating section 48-3, that the target pixel or neighboring pixel thereof is the left-to-right upward-slanting line image for the color component C3.

The color image left-to-right upward slanting line detecting/comparing section 58 outputs "11" when the target pixel or neighboring pixel thereof is the left-to-right upward-slanting line image for the color component C1, "10" when the target pixel or neighboring pixel thereof is the left-to-right upward-slanting line image for the color component C2, "01"

when the target pixel or neighboring pixel thereof is the left-to-right upward-slanting line image for the color component C3, and "00" when the target pixel or neighboring pixel thereof is not the left-to-right upward-slanting line image. The above-mentioned components for detecting the left-to-right upward-slanting line may collectively be called a left-to-right upward-slanting line detecting part.

Turning back to FIG. 10, a color image line-segment detecting/synthesizing section 59 determines that the target pixel or neighboring pixel thereof is a line-segment image, upon detecting the line image irrespective of the color components C1, C2, and C3 by at least one of the color image vertical line detecting/comparing section 52, the color image horizontal line detecting/comparing section 54, the color image left-to-right downward slanting line detecting/comparing section 56, and the color image left-to-right upward slanting line detecting/comparing section 58. Further, the color image line-segment detecting/synthesizing section 59 determines that the target pixel or neighboring pixel thereof is a surface image when the line image is not detected by the color image vertical line detecting/comparing section 52, the color image horizontal line detecting/comparing section 54, the color image left-to-right downward slanting line detecting/comparing section 56, and the color image left-to-right upward slanting line detecting/comparing section 58. That is, when at least one of output values of the color image vertical line detecting/comparing sections 52, 54, 56, and 58 is determined as the line-segment image, the color image line-segment detecting/synthesizing section 59 sets the output result of the corresponding comparing section as the output result of one color image line-segment detecting/synthesizing section 59. On the other hand, when a plurality of the output values of the color image vertical line detecting/comparing sections 52, 54, 56, and 58 are determined as the line-segment images, the color image line-segment detecting/synthesizing section 59 uses the upper-ranked output results in order to the output values of (comparing section 52>comparing section 54>comparing section 56>comparing section 58). When all the output values of the color image vertical line detecting/comparing sections 52, 54, 56, and 58 are "00", an output value "00" indicating the surface image is outputted. The vertical line detecting part, the horizontal line detecting part, the left-to-right downward slanting line detecting part, the left-to-right upward slanting line detecting part, and the line-segment detecting/synthesizing section 59 collectively serve as a first line-segment detecting part.

Next, a description will be given of components 61 to 69 forming a re-determining unit 200 as a main portion according to the second embodiment with reference to FIG. 10. A line-segment result line memory (first line-memory) 61 performs the processing similar to that of the line segment result line-memory 23 according to the first embodiment. That is, the line-segment result line memory 61 holds data input from the color image line-segment detecting/synthesizing section 59 and delays and outputs the data to the latter stage. Since the output result from the color image line-segment detecting/synthesizing section 59 is 2 bits, the line-segment result line memory 61 becomes a 2-bit line memory. A line-segment result counting section 62 counts the number of pixels on the line segment within the window by using the window shown in FIG. 6 for each of the color components C1, C2, and C3, similarly to the first embodiment, thereby obtaining the total number of pixels on the line segment. A second line-segment detecting section 63 re-determines the line-segment image with the counted value from the line-segment result counting section 62. Incidentally, the line-segment result line memory 61, the line-segment result counting section 62, and the second line-segment detecting section 63 may be referred to as a second line-segment detecting part in a lump.

Specifically, the second line-segment detecting section 63 determines, when the counted total number of pixels on the line segment is not smaller than a fifteenth threshold value (a predetermined threshold value), that the target pixel is the line-segment image and, when the counted total number of pixels on the line segment is smaller the fifteenth threshold value, that the target pixel is not the line-segment image. Herein, even if the target pixel is originally the line-segment image, the second line-segment detecting section 63 determines that the target pixel is not the line-segment image and then the target pixel is not finally the line-segment image. Further, the second line-segment detecting section 63 performs the following processing. If the second line-segment detecting section 63 determines that the target pixel is the line-segment image, when there are not the line-segment images for the color component C1 and the color component C2 in the window, the second line-segment detecting section 63 determines that the target pixel is the line-segment image for the color component C3, and outputs "01". If the second line-segment detecting section 63 determines that the target pixel is the line-segment image, when there are not the line-segment images for the color component C1 and the color component C3 in the window, the second line-segment detecting section 63 determines that the target pixel is the line-segment image for the color component C2, and outputs "10". When the second line-segment detecting section 63 determines that the target pixel is the line-segment image and the target pixel does not satisfy the above two conditions, the second line-segment detecting section 63 determines that the target pixel is the line-segment image for the color component C1, and outputs "11". When the target pixel is not the line-segment image, the second line-segment detecting section 63 outputs "00".

Next, a description will be given of third line-segment detecting processing. Pre-processing sections 64-1, 64-2, 64-3 are arranged corresponding to the color components C1, C2, and C3, and performs the processing similar to that of the pre-processing section 28 according to the first embodiment for the color components. For example, the pre-processing section 64-1 performs the MTF correction for the color component C1. Average calculating sections 65-1, 65-2, and 65-3 shown in FIG. 11 are arranged corresponding to the color components C1, C2, and C3, and performs the processing similar to that of the average calculating section 26 according to the first embodiment for the color components. For example, the average calculating section 65-1 calculates the average of pixel values for the color component C1 in the window shown in FIG. 7.

Threshold value generating sections 66-1, 66-2, and 66-3 are arranged corresponding to the color components C1, C2, and C3, and performs the processing similar to that of the threshold value generating section 27 according to the first embodiment for the color component. For example, the threshold value generating section 66-1 generates a threshold value (another threshold value) for the color component C1 in a graph shown in FIG. 9 with the average calculated by the average calculating section 65-1. Incidentally, the average calculating sections 65-1 to 65-3 and the threshold value generating sections 66-1 to 66-3 may be referred to as a threshold value generating part in a lump.

A third line-segment detecting section 67 determines the line-segment image by using the detection result of the second line-segment detecting section 63, the pre-processing results of the pre-processing sections 64-1 to 64-3, and the threshold values (other threshold values: sixteenth to eighteenth threshold values) generated by the threshold value generating sections 66-1 to 66-3. Specifically, when it is determined as the result of the second line-segment detection that the pixel is the line-segment image for the color component C1, the third line-segment detecting section 67 determines, when the pre-processing result of the color component C1 is not larger than the sixteenth threshold value for the color component C1, that the pixel is the line-segment image for the color component C1. In other words, with respect to the output from the second line-segment detecting section 63 indicating "11", the third line-segment detecting section 67 determines, when the result of the pre-processing section 64-1 is not larger than the sixteenth threshold value from the threshold value generating section 66-1, that the pixel is the line-segment image for the color component C1. With respect to the pixel that is determined as the line-segment image for the color component C2, that is, the pixel having "10" as the output result of the second line-segment detecting section 63, the third line-segment detecting section 67 determines, when the result of the pre-processing section 64-2 is larger than a seventeenth threshold value from the threshold value generating section 66-2, that the pixel is the line-segment image for the color component C2. Similarly, with respect to the pixel that is determined as the line-segment image for the color component C3, that is, the pixel having "01" as the output result of the second line-segment detecting section 63, the third line-segment detecting section 67 determines, when the result of the pre-processing section 64-3 is larger than the eighteenth threshold value from the threshold value generating section 66-3, that the pixel is the line-segment image for the color component C3. In the case except for the above conditions, the third line-segment detecting section 67 determines that the pixel is not the line-segment image.

The third line-segment detecting section 67 outputs, when the pixel is the line-segment image, "1" irrespective of the color components C1, C2, and C3, and, when the pixel is not the line-segment image, outputs "0". According to the second embodiment, the third line-segment detecting section 67 determines the cases for the color components C1, C2, and C3. Alternatively, the third line-segment detecting section 67 can determine the cases only for the color component C1 and can arbitrarily select the color component in consideration of the detection precision and the complication of the attachment.

A detection-result line memory (second line-memory) 68 holds the third line-segment detection result, and delays and outputs the result to the latter stage. A detection-result correcting section 69 performs the processing similar to that of the detection result correcting section 31 according to the first embodiment. That is, the detection-result correcting section 69 removes the detection result indicating the isolated point.

With the above processing, even in the case of the color image, not only the contour of the character and line but also the content can be extracted as the object. The second embodiment shows the example of the hardware structure. Alternatively, the second embodiment may be realized by software.

As will be obviously from the description according to the first and second embodiments, the conventional detection of only the contour by detecting the line-segment image from the image mixedly having the line segment and the dot can be extended by executing the re-determination including the second line-segment detection according to the present invention.

Further, the conventional detection of only the contour by detecting the line-segment image from the image mixedly having the line segment and the dot can be extended by executing the re-determination including the second line-segment detection and the third line-segment detection according to the present invention, thereby thinning the erroneously-detected portion.

Furthermore, the conventional detection of only the contour by detecting the line-segment image from the image mixedly having the line segment and the dot can be extended by executing the re-determination including the second line-segment detection and the third line-segment detection according to the present invention and the correction of the detection results. After that, the erroneously-detected portion is thinned (re-formed) and the isolated point is additionally removed. As a consequence, an obvious erroneously-detected portion is deleted, thereby obtaining a preferable detection result.

According to the present invention, it is possible to provide a line segment detector and a line segment detecting method in which the line segment of the character and the figure is detected from the input image and the present invention can be mainly applied to an image processing apparatus and an image compressor.

What is claimed is:

1. A line segment detector including a first line-segment detecting part comprising:
   a vertical line detecting part that detects whether or not an input image has a vertical line;
   a horizontal line detecting part that detects whether or not the input image has a horizontal line;
   a left-to-right downward slanting line detecting part that detects whether or not the input image has a left-to-right downward slanting line;
   a left-to-right upward slanting line detecting part that detects whether or not the input image has a left-to-right upward slanting line; and
   a line-segment detecting/synthesizing section implemented by a processor that calculates OR operation of output values from the vertical line detecting part, the horizontal line detecting part, the left-to-right downward slanting line detecting part, and the left-to-right upward slanting line detecting part,
   the line segment detector further comprising:
   a re-determining unit that re-determines whether or not the detection result output from the line-segment detecting/synthesizing section is a line segment, wherein the re-determining unit comprises a second line-segment detecting part that sets a window to the detection result near the target pixel, counts the number of pixels whose detection result is determined as the line segment in the set window, determines, when the counted value is not smaller than a predetermined threshold value, that the pixel is the line segment, further determines, when the counted value is smaller than the predetermined threshold value, that the pixel is not the line segment, and outputs a new detection result.

2. The line segment detector according to claim 1, wherein the second line-segment detecting part comprises:
   a first line-memory that holds and delays the detection result output from the line-segment detecting/synthesizing section;
   a line-segment result counting section that is connected to the first line-memory, sets the window to the detection result near the target pixel, and
   counts the number of pixels whose detection result in the window is determined as the line segment; and
   a second line-segment detecting section that compares the counted value of the line-segment result counting section with the predetermined threshold value, determines, when the counted value is not smaller than the predetermined threshold value, that the pixel is the line segment, further determines, when the counted value is smaller than the predetermined threshold value, that the pixel is not the line segment, and outputs the new detection result.

3. The line segment detector according to claim 2, wherein the re-determining unit further comprises:
a threshold value generating part that sets a window near the target pixel, calculates the average of pixel values in the set window, adds a specific value to the calculated average, and generates another threshold value for use in third line-segment detection;
a pre-processing section that performs pre-processing of the input image; and
a third line-segment detecting section that receives the detection result of the second line-segment detecting section and the processing result of the input image of the pre-processing section, and determines with the other threshold value generated by the threshold value generating part whether the detection result is a line image or surface image.

4. The line segment detector according to claim 3, wherein the threshold value generating part comprises:
an average calculating section that calculates the average of pixel values in the set window; and
a threshold value generating section that generates the other threshold value on the basis of the calculated average.

5. The line segment detector according to claim 4, the re-determining unit further comprises:
a second line-memory that holds and delays the third line-segment detection result output from the third line-segment detecting section; and
a detection result correcting section that is connected to the second line-memory, sets a window to the third line-segment detection result near the target pixel, and corrects the detection result of the target pixel when a specific pattern is found in the window.

6. The line segment detector according to claim 1, wherein the vertical line detecting part comprises:
a vertical line detecting/left portion averaging section that sets a first window for detecting the vertical line near the left of the target pixel in the input image, and calculates the weighted average of the pixel values in the first window for detecting the vertical line;
a vertical line detecting/right portion averaging section that sets a second window for detecting the vertical line near the right of the target pixel in the input image, and calculates the weighted average of the pixel values in the second window for detecting the vertical line;
a vertical line detecting/differentiating section that calculates an absolute value of the difference between an output value from the vertical line detecting/left portion averaging section and an output value from the vertical line detecting/right portion averaging section;
a vertical line/dot detecting section that sets a third window for detecting the vertical line having the target pixel in the input image, and averages an absolute value of a differentiating value between upper and lower pixels in the third window for detecting the vertical line; and
a vertical line detecting/comparing section that subtracts an output value of the vertical line/dot detecting section from an output value of the vertical line detecting/differentiating section, and determines, when the subtraction result is larger than a first threshold value, that the target pixel or neighboring pixel thereof is the vertical line image.

7. The line segment detector according to claim 1, wherein the horizontal line detecting part comprises:
a horizontal line detecting/upper-portion averaging section that sets a first window for detecting the horizontal line near the upper portion of the target pixel in the input image, and calculates the weighted average of the pixel values in the first window for detecting the horizontal line;
a horizontal line detecting/lower-portion averaging section that sets a second window for detecting the horizontal line near the lower portion of the target pixel in the input image, and calculates a weighted average of the pixel values in the second window for detecting the horizontal line;
a horizontal line detecting/differentiating section that calculates an absolute value of the difference between an output value from the vertical line detecting/upper-portion averaging section and an output value from the horizontal line detecting/lower-portion averaging section;
a horizontal line/dot detecting section that sets a third window for detecting the horizontal line having the target pixel in the input image, and calculates the average of absolute values of differential values between left and right pixels in the third window for detecting the horizontal line; and
a horizontal line detecting/comparing section that subtracts an output value of the horizontal line/dot detecting section from an output value of the horizontal line detecting/differentiating section, and determines, when the subtraction result is larger than a second threshold value, that the target pixel or neighboring pixel thereof is the horizontal line image.

8. The line segment detector according to claim 1, wherein the left-to-right downward slanting line detecting part comprises:
a left-to-right downward slanting line detecting/lower left oblique portion averaging section that sets a first window for detecting the left-to-right downward slanting line near the lower left oblique portion of the target pixel in the input image, and calculates a weighted average of pixel values in the first window for detecting the left-to-right downward slanting line;
a left-to-right downward slanting line detecting/upper right oblique portion averaging section that sets a second window for detecting the left-to-right downward slanting line near the upper right oblique portion of the target pixel in the input image, and calculates a weighted average of pixel values in the second window for detecting the left-to-right downward slanting line;
a left-to-right downward slanting line detecting/differentiating section that calculates an absolute value of the difference between an output value from the left-to-right downward slanting line detecting/lower left oblique portion averaging section and an output value from the left-to-right downward slanting line detecting/upper right oblique portion averaging section;
a left-to-right downward slanting line/dot detecting section that sets a third window for detecting the left-to-right downward slanting line having the target pixel in the input image, and averages an absolute value of a differential value between the pixels in the lower right oblique direction in the third window for detecting the left-to-right downward slanting line; and a left-to-right downward slanting line detecting/comparing section that subtracts an output value of the left-to-right downward slanting line/dot detecting section from an output value of the left-to-right downward slanting line detecting/differentiating section and determines, when the subtraction result is larger than a third threshold value, that the target pixel or neighboring pixel thereof is a left-to-right downward slanting line image.

9. The line segment detector according to claim 1, wherein the left-to-right upward slanting line detecting part comprises:
   a left-to-right upward slanting line detecting/upper left oblique portion averaging section that sets a first window for detecting the left-to-right upward slanting line near the upper left oblique portion of the target pixel in the input image, and calculates a weighted average of pixel values in the first window for detecting the left-to-right upward slanting line;
   a left-to-right upward slanting line detecting/lower right oblique portion averaging section that sets a second window for detecting the left-to-right upward slanting line near the lower right oblique portion of the target pixel in the input image, and calculates a weighted average of the pixel values in the second window for detecting the left-to-right upward slanting line;
   a left-to-right upward slanting line detecting/differentiating section that calculates an absolute value of the difference between an output from the left-to-right upward slanting line detecting/upper left oblique portion averaging section and an output value from the left-to-right upward slanting line detecting/lower right oblique portion averaging section;
   a left-to-right upward slanting line/dot detecting section that sets a third window for detecting the left-to-right upward slanting line having the target pixel in the input image, and calculates the average of absolute values of differential values between pixel values in the left-to-right upward slanting direction in the third window for detecting the left-to-right upward slanting line; and
   a left-to-right upward slanting line detecting/comparing section that subtracts an output value of the left-to-right upward slanting line/dot detecting section from an output value of the left-to-right upward slanting line detecting/differentiating section and determines, when the subtraction value is larger than a fourth threshold value, that the target pixel or neighboring pixel thereof is a left-to-right upward slanting line image.

10. A line segment detector including a first line-segment detecting part comprising:
    a vertical line detecting part that determines whether or not a color input image has a vertical line;
    a horizontal line detecting part that determines whether or not the color input image has a horizontal line;
    a left-to-right downward slanting line detecting part that determines whether or not the color input image has a left-to-right downward slanting line;
    a left-to-right upward slanting line detecting part that determines whether or not the color input image has a left-to-right upward slanting line; and
    a color image line-segment detecting/synthesizing section implemented by a processor that performs OR operation of output values from the vertical line detecting part, the horizontal line detecting part, the left-to-right downward slanting line detecting part, and the left-to-right upward slanting line detecting part, and
    the line segment detector further comprising:
    a re-determining unit that re-determines whether or not the detection result output from the line-segment detecting/synthesizing section is a line segment, wherein the re-determining unit comprises a second line-segment detecting part that sets a window to a line segment result near a target pixel, counts the number of pixels on the line segment in the window for individual color components C1, C2, and C3, determines, when the total number of pixels on the line segment counted is not smaller than a predetermined threshold value, that the pixel is the line segment, further determines, whether or not the total number of pixels on the line segment counted is smaller than the predetermined threshold value, that the pixel is not the line segment, furthermore determines which of the color components C1 to C3 the line segment corresponds to, and outputs a new line-segment detection result.

11. The line segment detector according to claim 10, wherein the:
    second line-segment detecting part comprises:
    a first line-memory that holds and delays the detection result output from the line-segment detecting/synthesizing section;
    a line-segment result counting section that is connected to the first line-memory, sets a window to a line-segment result near the target pixel, counts the number of pixels on the line segment in the window for the individual color components C1 to C3, and obtains the total number of pixels on the line segment; and
    a second line-segment detecting section that compares the counted total number of pixels on the line segment with the predetermined threshold value, determines, when the counted total number of pixels on the line segment is not smaller than the predetermined threshold value, that the pixel is the line segment, further determines, whether or not the counted total number of pixels on the line segment is smaller than the predetermined threshold value, that the pixel is not the line segment, furthermore determines which of the color components C1 to C3 the line segment corresponds to, and outputs the new line-segment detection result.

12. The line segment detector according to claim 11, wherein the re-determining unit further comprises:
    a threshold value generating part that sets a window near the target pixel, calculates the average of pixel values in the window for the individual color components C1 to C3, adds a specific value to the calculated average, and generates other threshold values for use in third line-segment detection for the individual color components C1 to C3;
    a pre-processing section that performs pre-processing of the color input image for the individual color components C1 to C3; and
    a third line-segment detecting section that determines at least one of the detection result of the second line-segment detecting part and the processing results of the individual color components C1 to C3 of the color input image of the pre-processing section with the other threshold value of the color component corresponding to the at least one of the processing results from among the other threshold values of the color components C1 to C3 generated by the threshold value generating part.

13. The line segment detector according to claim 12, wherein the threshold value generating part comprises:
    three average-calculating sections that calculate the averages of pixel values in the window for the individual color components C1 to C3; and three threshold value generating sections that generate the other threshold values for the individual color components C1 to C3 on the basis of the calculated averages.

14. The line segment detector according to claim 13, wherein the re-determining unit further comprises:
a second line-memory that holds and delays the third line-segment detection result output from the third line-segment detecting section; and
a detection result correcting section that is connected to the second line-memory, sets a window to the third line-segment detection result near the target pixel, and corrects the detection result of the target pixel when a specific pattern is found in the window.

15. The line segment detector according to claim 10, wherein the vertical line detecting part comprises, every axis of a color space:
a vertical line detecting/left portion averaging section that sets a first window for detecting the vertical line near the left of the target pixel in the input image, and calculates the weighted average of pixel values in the first window for detecting the vertical line;
a vertical line detecting/right portion averaging section that sets a second window for detecting the vertical line near the right of the target pixel in the input image, and calculates the weighted average of pixel values in the second window for detecting the vertical line;
a vertical line detecting/differentiating section that calculates an absolute value of the difference between an output value from the vertical line detecting/left portion averaging section and an output value from the vertical line detecting/right portion averaging section;
a vertical line/dot detecting section that sets a third window for detecting a vertical line having the target pixel in the input image, and calculates the average of absolute values of differential values between upper and lower pixels in the third window for detecting the vertical line; and
a vertical line differential-amount calculating section that subtracts an output value of the vertical line/dot detecting section from an output value of the vertical line detecting/differentiating section, and
the vertical line detecting part further comprises:
a vertical line differentiating-amount/distance calculating section that calculates, on the color space, the distance between the first window for detecting the vertical line and the second window for detecting the vertical line on the basis of output values from the vertical line differential-amount calculating section calculated every axis of the color space; and
a vertical line detecting/comparing section that determines, when an output value from the vertical line differentiating-amount/distance calculating section is larger than a threshold value for detecting the vertical line, that the target pixel or neighboring pixel thereof is a vertical line image.

16. The line segment detector according to claim 10, wherein the horizontal line detecting part comprises, every axis of a color space:
a horizontal line detecting/upper-portion averaging section that sets a first window for detecting the horizontal line near the upper portion of the target pixel in the input image, and calculates the weighted average of pixel values in the first window for detecting the horizontal line;
a horizontal line detecting/lower-portion averaging section that sets a second window for detecting the horizontal line near the lower portion of the target pixel in the input image, and calculates the weighted average in the second window for detecting the horizontal line;
a horizontal line detecting/differentiating section that calculates an absolute value of the difference between an output value from the vertical line detecting/upper-portion averaging section and an output value from the horizontal line detecting/lower-portion averaging section;
a horizontal line/dot detecting section that sets a third window for detecting the horizontal line having the target pixel in the input image, and averages absolute values of differential values between left and right pixels in the third window for detecting the horizontal line; and
a horizontal line differential-amount calculating section that subtracts an output value of the horizontal line/dot detecting section from an output value of the horizontal line detecting/differentiating section, and
the horizontal line detecting part further comprises:
a horizontal line differentiating-amount/distance calculating section that calculates, on the color space, the distance between the first window for detecting the horizontal line and the second window for detecting the horizontal line on the basis of output values from the horizontal line differential-amount calculating section calculated every axis of the color space; and
a horizontal line detecting/comparing section that determines, when an output value from the horizontal line differentiating-amount/distance calculating section is larger than a threshold value for detecting the horizontal line, that the target pixel or neighboring pixel thereof is a horizontal line image.

17. The line segment detector according to claim 10, wherein the left-to-right downward slanting line detecting part comprises, every axis of a color space:
a left-to-right downward slanting line detecting/lower left oblique portion averaging section that sets a first window for detecting the left-to-right downward slanting line near the lower left oblique portion of the target pixel in the input image, and the weighted average of pixel values in the first window for detecting the left-to-right downward slanting line;
a left-to-right downward slanting line detecting/upper right oblique portion averaging section that sets a second window for detecting the left-to-right downward slanting line near the upper right oblique portion of the target pixel in the input image, and calculates the weighted average of pixel values in the second window for detecting the left-to-right downward slanting line;
a left-to-right downward slanting line detecting/differentiating section that calculates an absolute value of the difference between an output value from the left-to-right downward slanting line detecting/lower left oblique portion averaging section and an output value from the left-to-right downward slanting line detecting/upper right oblique portion averaging section;
a left-to-right downward slanting line/dot detecting section that sets a third window for detecting the left-to-right downward slanting line having the target pixel in the input image, and averages absolute values of differential values between pixels in the left-to-right downward slanting line direction in the third window for detecting the left-to-right downward slanting line; and
a left-to-right downward slanting line/differentiating-amount calculating section that subtracts an output value of the left-to-right downward slanting line/dot detecting section from an output value of the left-to-right downward slanting line detecting/differentiating section, and the left-to-right downward slanting line detecting part further comprises:

a left-to-right downward slanting line differentiating-amount/distance calculating section that calculates, on the color space, the distance between the first window for detecting the left-to-right downward slanting line and the second window for detecting the left-to-right downward slanting line on the basis of output values from the left-to-right downward slanting line/differentiating-amount calculating section calculated every axis of the color space; and a left-to-right downward slanting line detecting/comparing section that determines, when the output value from the left-to-right downward slanting line differentiating-amount/distance calculating section is larger than a threshold value for detecting the left-to-right downward slanting line, that the target pixel or neighboring pixel thereof is a left-to-right downward slanting line image.

18. The line segment detector according to claim 10, wherein the left-to-right upward slanting line detecting part comprises, every axis of a color space:

a left-to-right upward slanting line detecting/upper left oblique portion averaging section that sets a first window for detecting the left-to-right upward slanting line near the upper left oblique portion of the target pixel in the input image, and calculates the weighted average of pixel values in the first window for detecting the left-to-right upward slanting line;

a left-to-right upward slanting line detecting/lower right oblique portion averaging section that sets a second window for detecting the left-to-right upward slanting line near the lower right oblique portion of the target pixel in the input image, and calculates the weighted average of pixel values in the second window for detecting the left-to-right upward slanting line;

a left-to-right upward slanting line detecting/differentiating section that calculates an absolute value of the difference between an output value from the left-to-right upward slanting line detecting/upper left oblique portion averaging section and an output value from the left-to-right upward slanting line detecting/lower right oblique portion averaging section;

a left-to-right upward slanting line/dot detecting section that sets a third window for detecting the left-to-right upward slanting line having the target pixel in the input image, and averages absolute values of differential values between pixels in the left-to-right upward slanting line direction in the third window for detecting the left-to-right upward slanting line; and a left-to-right upward slanting line/differentiating-amount calculating section that subtracts an output value of the left-to-right upward slanting line/dot detecting section from an output value of the left-to-right upward slanting line detecting/differentiating section, and the left-to-right upward slanting line detecting part further comprises:

a left-to-right upward slanting line differentiating-amount/distance calculating section that calculates, on the color space, the distance between the first window for detecting the left-to-right upward slanting line and the second window for detecting the left-to-right upward slanting line on the basis of output values from the left-to-right upward slanting line/differentiating-amount calculating section, calculated every axis of the color space; and a left-to-right upward slanting line detecting/comparing section that determines, when an output value from the left-to-right upward slanting line differentiating-amount/distance calculating section is larger than a threshold value for detecting the left-to-right upward slanting line, that the target pixel or neighboring pixel thereof is a left-to-right upward slanting line image.

* * * * *

UNITED STATES PATENT AND TRADEMARK OFFICE
CERTIFICATE OF CORRECTION

| | |
|---|---|
| PATENT NO. | : 7,945,095 B2 |
| APPLICATION NO. | : 11/621821 |
| DATED | : May 17, 2011 |
| INVENTOR(S) | : Kouichirou Hirao |

It is certified that error appears in the above-identified patent and that said Letters Patent is hereby corrected as shown below:

In the Specification

Column 19, Line 4: delete "5A" and insert -- 8A --

Column 22, Line 6: delete "36-3" and insert -- 35-3 --

Column 26, Line 55: delete "66" and insert -- 56 --

Signed and Sealed this
Fourth Day of March, 2014

Michelle K. Lee
*Deputy Director of the United States Patent and Trademark Office*